United States Patent
Rivett et al.

(10) Patent No.: US 6,630,237 B2
(45) Date of Patent: Oct. 7, 2003

(54) PEELABLY SEALED PACKAGING

(75) Inventors: Janet W. Rivett, Simpsonville, SC (US); Stephen R. Tanny, Newark, DE (US); Diane M. Hahm, Boothwyn, PA (US)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/777,240

(22) Filed: Feb. 5, 2001

(65) Prior Publication Data
US 2002/0172834 A1 Nov. 21, 2002

(51) Int. Cl.[7] .............................................. B32B 27/28
(52) U.S. Cl. ...................... 428/355; 428/500; 428/515; 428/513; 428/40.1
(58) Field of Search ................................ 428/40.1, 463, 428/476.1, 483, 513, 355 EN, 212, 220, 500, 515; 525/191, 221, 222, 223, 240

(56) References Cited

U.S. PATENT DOCUMENTS

| | | |
|---|---|---|
| 4,082,877 A | 4/1978 | Shadle |
| 4,189,519 A | 2/1980 | Ticknor |

(List continued on next page.)

FOREIGN PATENT DOCUMENTS

| | | |
|---|---|---|
| AU | 664650 | 10/1993 |
| EP | 213698 A | 3/1987 |
| EP | 213 698 B1 | 3/1987 |
| EP | 0 785 066 A2 | 7/1997 |
| EP | 0 916 482 A2 | 5/1999 |
| EP | 98106960.2 | 10/1999 |
| WO | 0 351 620 | 1/1990 |
| WO | 93/24568 | 12/1993 |
| WO | 94/28066 | 12/1994 |
| WO | 97/28960 | 8/1997 |
| WO | 97/48554 | 12/1997 |
| WO | 98/05706 | 2/1998 |
| WO | WO 99/54398 | * 4/1999 |
| WO | WO 99/54398 | 10/1999 |

OTHER PUBLICATIONS

Isao et al, "Highly Stretched Multilayered Film and Manufacture Thereof," English Abstract of Japanese Patent Application No. 58175635 A2 published Oct. 14, 1983.

Mitsubishi Chemical Corporation, "Polyolefin resin compsn. for stretchable packaging films . . . ," English Abstract of Japanese Patent Application No. 08208895 A published Aug. 13, 1996.

Makoto et al, "Stretched Film for Food Packing and Production Thereof," English Abstract of Japanese Patent Application No. 6270248 A2 published Sep. 27, 1994.

Eisaku et al, "Olefin Polymer Compositions," English Abstract of Japanese Patent Application No. 4093340A2 published Mar. 26, 1992.

(List continued on next page.)

*Primary Examiner*—Robert Dawson
*Assistant Examiner*—Christopher M. Keehan
(74) *Attorney, Agent, or Firm*—Daniel B. Ruble

(57) ABSTRACT

A peelably sealed package includes a web having a peelable layer and a substrate having a surface layer. The peelable layer includes a blend of: i) from about 3 to about 15 weight parts polybutylene, ii) from about 40 to about 75 weight parts ionomer, and iii) from about 20 to about 55 weight parts ethylene/unsaturated ester copolymer such as a vinyl ester of aliphatic carboxylic acid or an alkyl ester of acrylic or methacrylic acid. The surface layer of the substrate includes a polyethylene having a density of from about 0.915 to about 0.93 g/cc, an ionomer, or a mixture of these polymers. The peelable layer of the web and the surface layer of the substrate are peelably sealed to each other in one or more selected areas. The peelable layer may form a peelable seal having a peel strength that is essentially equivalent regardless of whether the contact surface of the substrate is a polyethylene or an ionomer.

57 Claims, 4 Drawing Sheets

U.S. PATENT DOCUMENTS

| | | | |
|---|---|---|---|
| 4,277,578 A | 7/1981 | Yoshimura et al. |
| 4,356,222 A | 10/1982 | Harakawa et al. |
| 4,469,754 A | 9/1984 | Hoh et al. |
| 4,501,634 A | 2/1985 | Yoshimura et al. |
| 4,521,467 A | 6/1985 | Berger |
| 4,619,859 A | 10/1986 | Yoshimura et al. |
| 4,680,340 A | 7/1987 | Oreglia et al. |
| 4,729,476 A | 3/1988 | Lulham et al. |
| 4,766,174 A | 8/1988 | Statz |
| 4,859,514 A | 8/1989 | Friedrich et al. |
| 4,876,156 A | 10/1989 | Hwo |
| 4,916,190 A | 4/1990 | Hwo |
| 4,944,409 A | 7/1990 | Busche et al. |
| 5,023,121 A | 6/1991 | Pockat et al. |
| 5,066,543 A | 11/1991 | Hwo |
| 5,073,414 A | 12/1991 | Castro |
| 5,126,197 A | 6/1992 | Schinkel et al. |
| 5,334,643 A | 8/1994 | Gage |
| 5,547,752 A | 8/1996 | Yanidis |
| 5,593,775 A | 1/1997 | Hargarter et al. |
| 5,604,000 A | 2/1997 | May |
| 5,663,232 A | 9/1997 | Seppanen et al. |
| 5,677,069 A | 10/1997 | Seppanen et al. |
| 5,716,698 A | 2/1998 | Schreck et al. |
| 5,733,636 A | 3/1998 | May |
| H1727 H | 5/1998 | Jones et al. |
| 5,891,500 A | 4/1999 | Brodie, III |
| 5,919,547 A | 7/1999 | Kocher et al. |
| 5,919,863 A | 7/1999 | Seppanen et al. |

OTHER PUBLICATIONS

Masayuki et al, "Water–Absorption Polyolefin Resin Composition," English Abstract of Japanese Patent Application No. 61200142A2 published Sep. 4, 1986.

Minoru et al, "Preparation of Resin Composition," English Abstract of Japanese Patent Application No. 58101134A2 published Jun. 16, 1983.

Mitsui DuPont Polychemical, "Polymer compsn. for peelable fusion sealing...," English Abstract of Japanese Patent Application No. 63051438 A published Mar. 4, 1988.

Mitsui Dupont Polychemical, "Ethylene polymer composition used for easy peelable sealing material..," English Abstract of Japanese Patent Application No. 11071483 A published Jun. 16, 1999.

Mitsui Petrochem KK, "Peelable Paint compsns...," English Abstract of Japanese Patent Application No. 52091036 A published Aug. 1, 1977.

DuPont Powerpoint Presentation entitled "SURLYN 1650SB Peelable Blends with PB".

Hwo Polybutylene Blends as Easy Open Seal Coats for Flexible Packaging and Lidding, Journal of Plastic Film & Sheeting, vol. 3, Oct. 1987, pp. 245–260.

Hwo, Polybutylene Blends as Easy Open Seal Coats for Flexible Packaging and Lidding, Shell Development Company, Presentation at 1987 Tappi Polymers, Laminations and Coatings Conference, San Francisco, CA, Sept. 09–11, 1987.

* cited by examiner

FIG. 1
FIG. 2
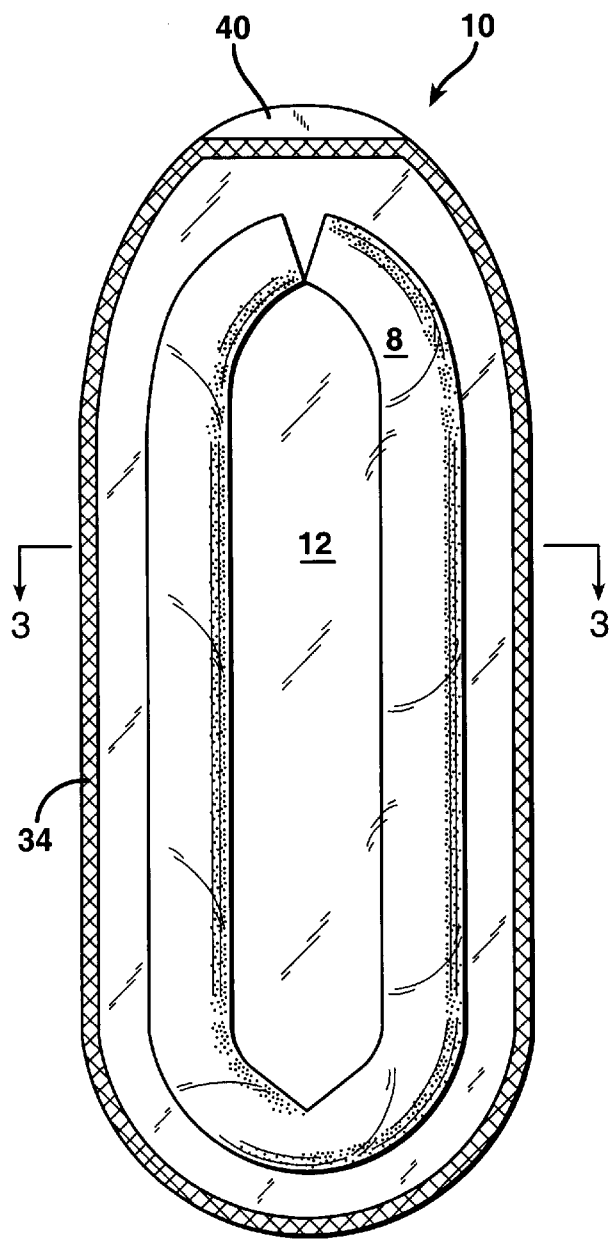
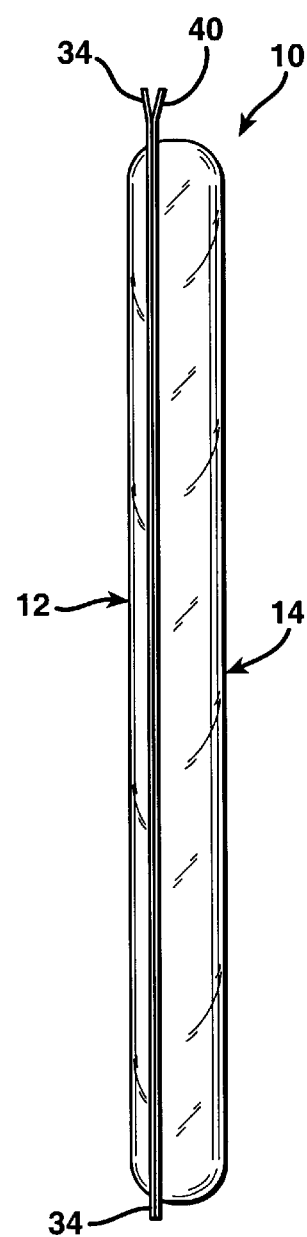

PEELABLY SEALED PACKAGING

BACKGROUND OF THE INVENTION

The present invention relates to peelably sealed packaging, and more particularly to peelable films useful to incorporate in peelably sealed packaging.

Peelably sealed, "easy-open" packaging is used in a variety of food and non-food packaging applications to provide packaging that is easy for the consumer to open without having to tear the packaging. Peelably sealed packaging may take several forms. For example, a flexible film lidding or lid stock material may be peelably adhered to a rigid tray, tub, or container. Alternatively, the easy-open packaging may incorporate a peelable seal between a combination of one or more of flexible films, webs, substrates, or supports. Examples of this alternative include thermoforming and vacuum skin packaging methods known in the art. For example, the lower web or support (e.g., "formed web") may be heated and deep-drawn to form a receptacle for the item to be packaged. Once the item is placed on the support, the upper web (e.g., "non-formed web") is drawn over the item and peelably sealed to the peripheral edges of the support. The seal may be formed using heated sealing bars, platens, or frames to apply heat and pressure to the top and bottom webs in the seal area.

Other types of easy-open packaging may be formed using vertical-form-fill-seal (VFFS) or horizontal-form-fill-seal (HFFS) methods known in the art to form a pouch or bag containing the packaged product. In such alternatives, the peelable film or web may in effect be sealed to itself (i.e., the same type of film material may form both the top and bottom web of the packaging).

The layer of the peelable film that primarily facilitates the easy-open, peelable seal is known as the "peelable layer" or "separation layer." If the film is a mono-layer film, then the film itself may be considered the peelable layer. If the peelable layer is an outer layer of a multi-layer film, then the peelable layer may be a sealant layer (e.g., heat-seal layer) of the film.

A peelable layer may also be an internal layer of a multi-layer film. In such an arrangement, one or more layers of a film may be hand peeled away (i.e., delaminated) from the remaining layers of the film, which remain attached to the substrate. This design may be used, for example, to peel away oxygen-impermeable layers of a film from the oxygen-permeable layers of the film at a desired time after the original construction of the packaging. Such a design is described, for example, in U.S. Pat. No. 5,919,547 issued Jul. 6, 1997 to Kocher, which is incorporated herein in its entirety by reference.

To open an easy-open packaging, the consumer simply grasps a portion of one web and pulls or "peels" it away from a second web or support—thereby causing the peelable seal to "fail." The type of failure depends on the design and location of the peelable layer. With an "interfacial peel" or "surface peel," the peelable layer may be located as an outer sealant layer of the top film, so that the top film separates from the substrate to which it adheres at the interface between the peelable layer of the top film and the substrate. Alternatively, with a "delamination peel," the peelable layer may be located as an internal layer of the top film, so that the top film separates between the peelable layer and another layer of the top film (i.e., interlayer separation).

The peelable seal failure mechanism may be further classified as: 1) a "cohesive failure," in which the molecular attractive forces holding together the peelable layer composition are overcome, or 2) an "adhesive failure," in which the interfacial forces (e.g., valence forces or interlocking action or both) holding two surfaces together are overcome, or 3) a combination of both. Regardless of the type of peelable seal failure, it is desirable that the failure not cause "angel hair" or strings of resin to form or remain between the peeled layer and the substrate upon peeling.

The peelable seal should be sufficiently strong to withstand the expected abuse during the packaging operation, distribution, and storage. If the seal bond strength is too weak, then the package may open prematurely. However, the peelable seal must also provide a sufficiently low bond strength to allow the end-user to easily peel open the package by hand. If too high of a peel force is needed to open the peelably sealed packaging, then the peelable film may be considered "locked down"—that is, too hard to open easily by hand.

If the peelable layer of the film is an outer, sealant layer of the film, then it is desirable that the peelable layer have a relatively low heat seal initiation temperature in order to allow the equipment used to form the heat seals to run at relatively fast speeds. Further, it is also desirable that a packager be able to increase the bond strength of the peelable seal merely by increasing the heat seal temperature at which the peelable seal is made. This is because the packager may desire to form a less easily peeled seal for some applications (e.g., liquid packaging) than others (e.g., dry cereal packaging). However, it is also desirable that the peelable seal strength gradually increase as the sealing temperature increases, so that the sealing temperature does not have to be monitored so closely by the packager. Otherwise, a relatively small drift or variation in the sealing temperature that may be associated with the sealing equipment may cause a large variation in the peelable seal strength.

The bottom web or substrate of an easy-open package is often an ionomer-based surface or an LLDPE-based surface, depending on the packaging application and the desired performance attributes. However, existing peelable films that form an acceptable peelable seal at a given temperature with an ionomer-based surface generally do not tend to form an acceptable peelable seal at the same given temperature with an LLDPE-based surface. Conversely, peelable films that form an acceptable peelable seal at a given temperature with an LLDPE-based surface generally do not tend to form an acceptable peelable seal at the same given temperature with an ionomer-based surface. As a result, packagers that use both ionomer-surfaced substrates and LLDPE-surfaced substrates in providing easy-open packaging must currently purchase at least two separate types of top film or lid stock depending on the composition of the substrate. Further, to meet this demand, peelable film suppliers must be able to provide at least two types of compatible top film or lid stock to the packagers. This increases the amount of peelable film inventory that the easy-open packager or peelable film supplier must carry—and also increases the complexity and cost of the manufacture of easy-open packaging.

SUMMARY OF THE INVENTION

The present invention addresses one or more of the aforementioned problems. A peelably sealed package includes a web having a peelable layer and a substrate having a surface layer. The peelable layer includes a blend of: i) from about 3 to about 15 weight parts polybutylene, ii) from about 40 to about 75 weight parts ionomer, and iii)

from about 20 to about 55 weight parts ethylene/unsaturated ester copolymer. The unsaturated ester may be a vinyl ester of aliphatic carboxylic acid, where the vinyl ester has from 4 to 12 carbon atoms, or an alkyl ester of acrylic or methacrylic acid, where the alkyl ester has from 4 to 12 carbon atoms. The surface layer of the substrate includes a polyethylene having a density of from about 0.915 to about 0.93 g/cc, an ionomer, or a mixture of these polymers. The peelable layer of the web and the surface layer of the substrate are peelably sealed to each other in one or more selected areas.

In another aspect, a thermoplastic film useful as a peelable film has at least one layer comprising a blend of from about 3 to about 15 parts polybutylene, from about 40 to about 75 parts ionomer, and from about 20 to about 55 weight parts ethylene/unsaturated ester copolymer. The unsaturated ester is a vinyl ester of aliphatic carboxylic acid, where the vinyl ester has from 4 to 12 carbon atoms, or an alkyl ester of acrylic or methacrylic acid, where the alkyl ester has from 4 to 12 carbon atoms.

The inventive peelable film is useful in forming peelably sealed packaging. A packager may use the same peelable film with substrates having either a polyethylene contact surface or an ionomer contact surface—without having to significantly adjust or change the heat sealing temperature of the sealing equipment. This allows the packager to reduce the inventory of peelable film stock because the same peelable film may be used to form effective peelable seals with either type of substrate. Further, because the heat sealing temperature does not need to be adjusted, the use of the inventive peelable film enhances the flexibility and speed of changeover in packaging configurations between the ionomer and polyethylene surfaced substrates. Since the peel strength of the peelable seal increases as the heat seal temperature increases, the packager may increase the peel strength merely by increasing the heat seal temperature. Further, because the peel strength gradually increases with the increase in heat seal temperature, the packager does not have to monitor the sealing temperature so closely to avoid a relatively small drift or variation in the sealing temperature from causing a large change in the peel strength of the peelable seal.

These and other objects, advantages, and features of the invention will be more readily understood and appreciated by reference to the detailed description of the invention and the drawings.

BRIEF DESCRIPTION OF THE DRAWINGS

FIG. 1 is top view of a thermoformed, vacuum skin package made in accordance with the present invention;

FIG. 2 is a side elevational view of the package of FIG. 1;

DETAILED DESCRIPTION OF THE INVENTION

The peelably sealed packaging 10, 50 (FIGS. 1–3 and 6) of the present invention incorporates a peelable film 12 that may be sealed to a substrate 14 (FIGS. 4–5 and 7–10) or to itself The peelable film includes at least one peelable layer 16 having a blend of polybutylene ("PB"), ionomer, and ethylene/unsaturated ester copolymer, such that the peelable layer is capable of forming an essentially equivalent peelable seal (at the same heat seal conditions) with either an ionomer-surfaced substrate or a polyethylene-surfaced substrate, as discussed in more detail below.

Peelable Film

Figure 8:
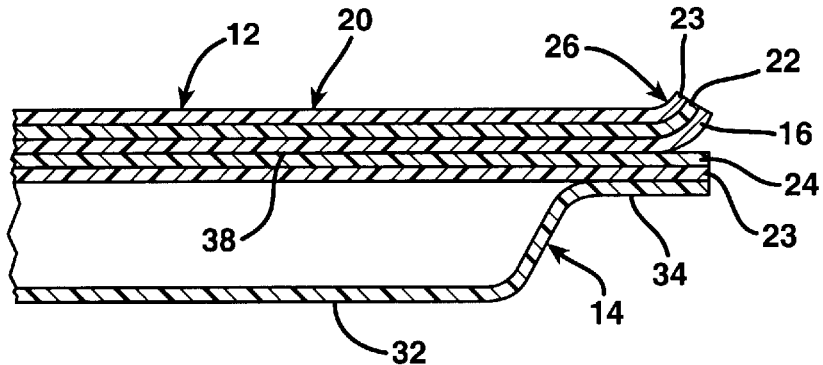
FIG. 8 is a representational sectional view of an alternative embodiment of the package of FIG. 6 showing an alternative lid web as delamination peeling is initiated.
Figure 9:
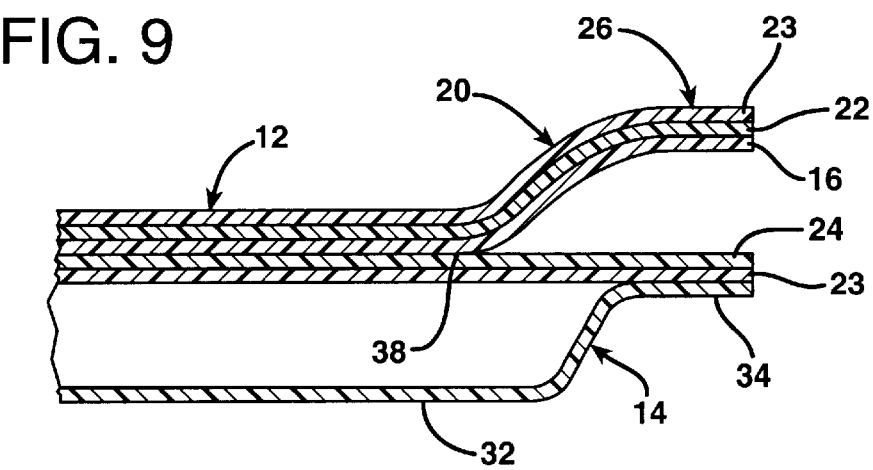
FIG. 9 is a representational sectional view of the package of FIG. 8 as delamination peeling is at a later stage than in FIG. 8.
Figure 10:
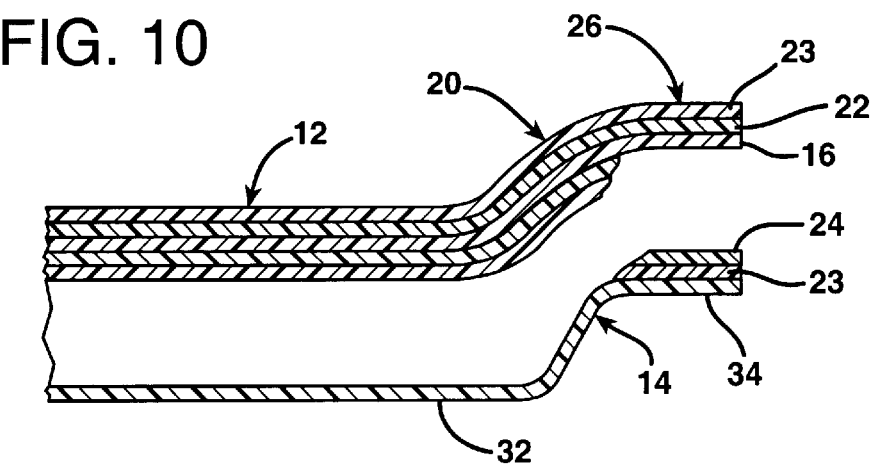
FIG. 10 is a representational sectional view of an alternative embodiment of the package of FIG. 8 showing an alternative easy open peel mechanism using a combination adhesive and cohesive fail mechanism.

The peelable film or web 12 may be a monolayer film 18 or multiple layer film 20. The peelable film includes at least one peelable or separation layer 16. If the film is monolayer, then the peelable layer 16 is the sole layer of the peelable film, in which case the terms "film" and "layer" have the same meaning. If the film is multilayered, then the peelable layer 16 may be an internal or inner layer of the film—that is, having both surfaces of the layer directly adhered to another layer of the film—in which case peelable film 12 is a delamination peelable film 26. (FIGS. 8–9.)

Figure 5:
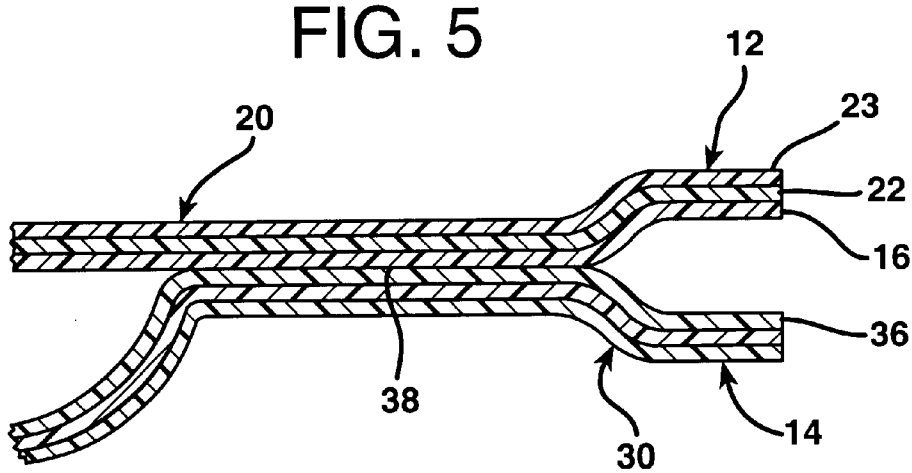
FIG. 5 is a representational sectional view of alternative top and bottom webs for the package of FIG. 1 as peeling between the webs is initiated.
Figure 7:
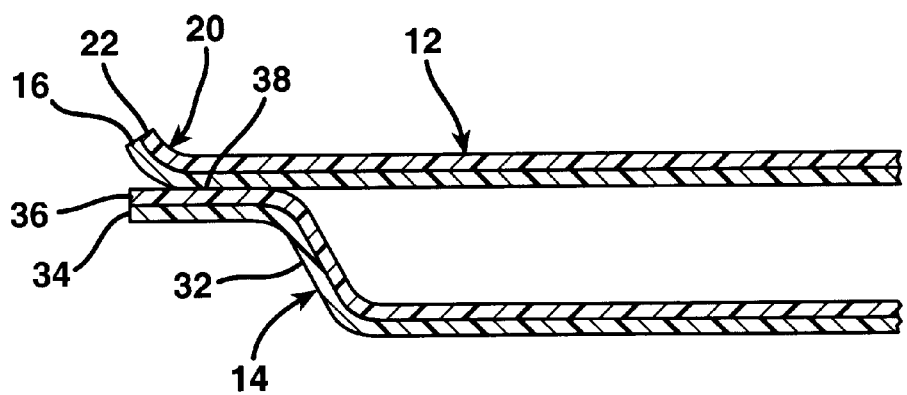
FIG. 7 is a representational sectional view of the package of FIG. 6 as the lid web is surface peeled away from the tray.

Alternatively, the peelable layer 16 may be an outer layer of the film—that is, having only one side directly adhered to another layer of the film (in the case of a multiple layer peelable film 20)—or having neither side directly adhered to another layer of the film (in the case of monolayer peelable film 18). If the peelable layer 16 is an outer layer of the peelable film 12, then the peelable layer 16 may be a sealant layer (e.g., heat-seal layer) of the peelable film to facilitate sealing the peelable film to substrate 14. (FIG. 5.)

Peelable Layer of the Peelable Film

The peelable layer includes a blend of polybutylene, ionomer, and ethylene/unsaturated ester copolymer. Useful peelable layer thicknesses include those that range from about 0.25 to about 1.5 mil, about 0.25 to about 1 mil, about 0.25 to about 0.75 mil, about 0.5 to about 1 mil, and 0.5 to about 0.75 mil.

Polybutylene

Polybutylene ("PB"), also known as polybutene-1, is derived from the polymerization of butene-1 monomer, with or without other olefin monomers (e.g., ethylene or alpha olefin monomers such as propylene, hexene, or octene). Accordingly, PB may be either a homopolymer or a copolymer. Useful PB copolymer may include less than about each of the following weight % non-butylene comonomer content: 10%, 8%, 6%, 4%, and 2%. Preferably, the comonomer, if present, is ethylene. PB is an isotactic, stereoregular, semi-crystalline thermoplastic polymer. The PB may be thermoplastic and/or elastomeric, but is preferably nonelastomeric. Examples of useful elastomeric PB are disclosed in U.S. Statutory Invention Registration H1583, corresponding to International Patent Application Publication WO 94/28066 published Dec. 8, 1994, each of which is incorporated herein in its entirety.

The PB in the blend acts as a "contaminant" or "incompatible" component to enhance the peelability of the peelable layer by weakening the seal between the peelable layer and the adjacent layer or substrate. For example, PB does not bond well to LLDPE.

Examples of useful commercially available PB resins include those used in the examples below, and others available from Montell Polyolefins (now Basell) under the tradenames PB 1710A—which is believed to be a blend of 81.5 weight % PB 8640 (see PB3 in examples below), 7% polypropylene, and 1.5% HDPE—and DP 1560, which is believed to be a blend of 80 weight % PB 8640 and 20 weight % polypropylene.

The peelable layer blend may include from about 3 to about 15 weight parts PB, relative to the PB, ionomer, and ethylene/unsaturated ester copolymer content of the peelable layer. Other useful ranges of PB weight parts in the peelable layer include from about 5 to about 12, from about 5 to about 10, from about 6 to about 10, from about 7 to about 10, from about 5 to about 9, from about 5 to about 8, from about 6 to about 9, and from about 7 to about 8. The peelable layer may include from about 3 to about 15 weight % PB. Other useful ranges of PB weight % content in the peelable layer include from about 5 to about 12, from about 5 to about 10, from about 6 to about 10, from about 7 to about 10, from about 5 to about 9, from about 5 to about 8, from about 6 to about 9, and from about 7 to about 8.

Ionomer

Ionomer is a copolymer of an ethylene and an ethylenically unsaturated monocarboxylic acid having the carboxylic acid groups partially neutralized by a metal ion, such as sodium or zinc, preferably zinc. Useful ionomers include those in which sufficient metal ion is present to neutralize from about 15% to about 60% of the acid groups in the ionomer. The carboxylic acid is preferably "(meth)acrylic acid"—which means acrylic acid and/or methacrylic acid. Useful ionomers include those having at least 50 weight % and preferably at least 80 weight % ethylene units. Useful ionomers also include those having from 1 to 20 weight percent acid units. Useful ionomers are also described in U.S. Pat. No. 3,355,319 and are available commercially from E.I. du Pont de Nemours and Company (Wilmington, Del.) under the trademark SURLYN, for example SURLYN 1652, SURLYN 1650, and SURLYN 1601.

The peelable layer blend may include from about 40 to about 75 weight parts ionomer, relative to the PB, ionomer, and ethylene/unsaturated ester copolymer content of the peelable layer. Other useful ranges of ionomer weight parts in the peelable layer include from about 45 to about 75, from about 50 to about 75, from about 55 to about 75, from about 60 to about 75, from about 40 to about 70, from about 40 to about 65, from about 40 to about 60, from about 40 to about 55, from about 45 to about 70, from about 50 to about 65, and from about 55 to about 60. The peelable layer may include from about 40 to about 75 weight % ionomer. Other useful ranges of ionomer weight % content in the peelable layer include from about 45 to about 75, from about 50 to about 75, from about 55 to about 75, from about 60 to about 75, from about 40 to about 70, from about 40 to about 65, from about 40 to about 60, from about 40 to about 55, from about 45 to about 70, from about 50 to about 65, and from about 55 to about 60.

Ethylene/Unsaturated Ester Copolymer

Ethylene/unsaturated ester copolymer is the copolymer of ethylene and unsaturated ester monomers. Useful unsaturated esters include: 1) vinyl esters of aliphatic carboxylic acids, where the esters have from 4 to 12 carbon atoms, and 2) alkyl esters of acrylic or methacrylic acid (collectively, "alkyl (meth)acrylate"), where the esters have from 4 to 12 carbon atoms.

Representative examples of the first ("vinyl ester") group of monomers include vinyl acetate, vinyl propionate, vinyl hexanoate, and vinyl 2-ethylhexanoate. The vinyl ester monomer may have from 4 to 8 carbon atoms, from 4 to 6 carbon atoms, from 4 to 5 carbon atoms, and preferably 4 carbon atoms.

Representative examples of the second ("alkyl (meth) acrylate") group of monomers include methyl acrylate, ethyl acrylate, isobutyl acrylate, n-butyl acrylate, hexyl acrylate, and 2-ethylhexyl acrylate, methyl methacrylate, ethyl methacrylate, isobutyl methacrylate, n-butyl methacrylate, hexyl methacrylate, and 2-ethylhexyl methacrylate. The alkyl (meth)acrylate monomer may have from 4 to 8 carbon atoms, from 4 to 6 carbon atoms, and preferably from 4 to 5 carbon atoms.

The unsaturated ester (i.e., vinyl ester or alkyl (meth) acrylate) comonomer content of the ethylene/unsaturated ester copolymer may range from about 6 to about 18 weight %, and from about 8 to about 12 weight %, based on the weight of the copolymer. Useful ethylene contents of the ethylene/unsaturated ester copolymer include the following amounts: at least about 82 weight %, at least about 85 weight %, at least about 88 weight %, no greater than about 94 weight %, no greater than about 93 weight %, and no greater than about 92 weight %, based on the weight of the copolymer. As the level of unsaturated ester comonomer increases, the ethylene/unsaturated ester copolymer tends to bond more strongly to ionomer and less strongly to LLDPE. As the level of unsaturated ester comonomer decreases, then converse tends to be true. This guidance is useful in selecting a desired level of unsaturated ester comonomer in the ethylene/unsaturated ester copolymer.

Representative examples of ethylene/unsaturated ester copolymers include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, and ethylene/vinyl acetate.

Useful ethylene/alkyl (meth)acrylate copolymers are commercially available, for example, from Eastman Chemical Company (Kingsport, Tenn.), sold under the trademark EMAC and ExxonMobil Chemical Company (Houston, Tex.), sold under the trademark OPTEMA.

Useful EVA is commercially available from E.I. du Pont de Nemours and Company (Wilmington, Del.) under the trademark ELVAX, for example, ELVAX 3165 (0.7 MI, 18% VA, 0.94 g/cc density), ELVAX 6449, ELVAX 3134 (9% VA); from Exxon Corporation under the trademark ESCORENE, for example, ESCORENE LD-318.92 (9% VA, a 0.93 g/cc density, and 2.0 MI) and LD-761.36 T (15% VA, 3.6 MI, 0.933 g/cc density); and from Chevron Corporation under the PE5269 T trademark (6.5% VA, 0.5 MI, 0.9315 g/cc density). "MI" means melt flow index having the units of g/10 minutes (measured at 190° C. with a weight of 2.16 kg); "VA" means vinyl acetate, the content of VA comonomer in the EVA expressed as weight percent.

The peelable layer blend may include from about 20 to about 55 weight parts ethylene/unsaturated ester copolymer, relative to the PB, ionomer, and ethylene/unsaturated ester copolymer content of the peelable layer. Other useful ranges of ethylene/unsaturated ester copolymer weight parts in the peelable layer include from about 25 to about 55, from about 30 to about 55, from about 35 to about 55, from about 40 to about 55, from about 45 to about 55, from about 25 to about 50, from about 25 to about 45, from about 25 to about 40, from about 25 to about 35, from about 25 to about 50, from about 30 to about 45, from about 35 to about 50, from about 45 to about 50, and from about 40 to about 45. The peelable layer may include from about 20 to about 55 weight % ethylene/unsaturated ester copolymer. Other useful ranges of ethylene/unsaturated ester copolymer weight % content in the peelable layer include from about 25 to about 55, from about 30 to about 55, from about 35 to about 55, from about 40 to about 55, from about 45 to about 55, from about 25 to about 50, from about 25 to about 45, from about 25 to about 40, from about 25 to about 35, from about 25 to about 50, from about 30 to about 45, from about 35 to about 50, from about 45 to about 50, and from about 40 to about 45.

Other Layers of the Peelable Film

The multiple layer peelable film 20 includes one or more layers in addition to the peelable layer 16. Adjacent adhered layer 22 may be bonded, extruded, or adhered to the peelable layer 16, and is designed to form a bond strength to the peelable layer 16 (i.e., "interlayer bond strength") that is stronger than the peelable seal bond formed between the peelable layer 16 and either substrate 14 (in the case of FIGS. 5 and 7) or delamination film layer 24 (in the case of delamination peelable film 26, FIGS. 8–10).

The delamination film layer 24 of delamination peelable film 26 may include the ionomers and polyethylenes as discussed with respect to the substrate surface layer 36 discussed below. For example, the delamination film layer 24 may comprise at least 70 weight percent, or at least 80 weight percent of such polyethylene or ionomer. Multiple layer film 20 may also include one or more additional layers 23.

The multiple layer peelable film 20 may include any number of layers 22, 23, 24 in addition to the peelable layer 16, for example the multiple layer peelable film may include a total of any of the following: from 2 to 20 layers, at least 3 layers, at least 4 layers, at least 5 layers, and from 5 to 9 layers. The multiple layer peelable film 20 may include one or more of each of: i) an inside layer (i.e., heat seal layer), ii) an outside layer (e.g., print side layer), iii) a gas barrier layer, iv) a tie layer, v) an abuse layer, and vi) a bulk layer. Below are some examples of combinations in which the alphabetical symbols designate the resin layers. Where the multilayer peelable film representation below includes the same letter more than once, each occurrence of the letter may represent the same composition or a different composition within the class that performs a similar function.

A/D, A/C/D, A/B/D, A/B/C/D, A/C/B/D, A/B/C/E/D, A/E/C/E/D, A/B/E/C/D, A/C/B/E/D, A/C/E/B/D, A/E/B/C/D, A/E/C/B/D, A/C/B/C/D, A/B/C/B/D, A/B/C/E/B/D, A/B/C/E/C/D, A/B/E/C/B/D, A/C/E/C/B/D, A/B/C/B/B/D, A/C/B/B/B/D, A/C/B/C/B/D, A/C/E/B/B/D, A/B/E/C/E/B/D, A/B/E/C/E/B/E/D, A/A'/D, A/A'/C/D, A/A'/B/D, A/A'/B/C/D, A/A'/C/B/D, A/B/A'/C/E/D, A/E/C/A'/E/D, A/B/E/C/A'/D, A/C/A'/B/E/D, A/A'/C/E/B/D, A/E/B/A'/C/D, A/E/A'/C/B/D, A/C/B/A'/C/D, A/B/A'/C/B/D, A/B/A'/C/E/B/D, A/B/C/A'/E/C/D, A/A'/B/E/C/B/D, A/A'/C/E/C/B/D, A/A'/B/C/B/B/D, A/A'/C/B/B/B/D, A/A'/C/B/C/B/D, A/A'/C/E/B/B/D, A/A'/B/E/C/E/B/D, A/A'/B/E/C/E/B/E/D

"A" is a heat seal layer, that is, a layer adapted to facilitate the heat-sealing of the film to itself or to another object, such as a substrate, as is known in the art. The "A" layer may be a peelable layer (i.e., layer 16).

"A'" is a peelable layer (i.e., layer 16) located as an inner or internal layer of the multiple layer film 20, in which case at least one layer adjacent to A' preferably comprises polyethylene having a density of from about 0.915 to about 0.93 g/cc or ionomer.

"B" is a core or bulk layer, as discussed below.

"C" is a barrier layer, as discussed below.

"D" is an outside (i.e., abuse or print side) layer, as discussed below.

"E" is a tie layer, as discussed below.

Core or Bulk Layers "B"

The peelable film 20 may include one or more layers to serve as core, bulk, and/or abuse layers. Such a layer may include one or more polymers that include mer units derived from at least one of a $C_2$–$C_{12}$ alpha-olefin, styrene, amides, esters, and urethanes. Preferred among these are those homo- and co-polymers (including terpolymers, etc.) that include mer units derived from ethylene, propylene, and 1-butene, even more preferably an ethylene copolymer such as, for example, ethylene/$C_3$–$C_8$α-olefin copolymer, ethylene/ethylenically unsaturated ester copolymer (e.g., ethylene/butyl acrylate copolymer), ethylene/ethylenically unsaturated acid copolymer (e.g., ethylene/(meth)acrylic acid copolymer), and ethylene/vinyl acetate copolymer. Preferred ethylene/vinyl acetate copolymers are those that include from about 2.5 to about 27.5 weight %, preferably from about 5 to about 20%, even more preferably from about 5 to about 17.5% mer units derived from vinyl acetate. Such a polymer preferably has a melt index of from about 0.3 to about 25, more preferably from about 0.5 to about 15, still more preferably from about 0.7 to about 5, and most preferably from about 1 to about 3.

The peelable film may include one or more layers derived at least in part from a polyester and/or a polyamide. Examples of suitable polyesters include amorphous (co) polyesters, poly(ethylene/terephthalic acid), and poly (ethylene/ naphthalate), although poly(ethylene/terephthalic acid) with at least about 75 mole percent, more preferably at least about 80 mole percent, of its mer units derived from terephthalic acid may be preferred for certain applications. Examples of suitable polyamides include polyamide 6, polyamide 9, polyamide 10, polyamide 11, polyamide 12, polyamide 66, polyamide 610, polyamide 612, polyamide 6I, polyamide 6T, polyamide 69, copolymers made from any of the monomers used to make two or more of the foregoing homopolymers, and blends of any of the foregoing homo- and/or copolymers.

Barrier Layer "C"

The peelable film may include one or more barrier layers between the inside and outside layers. A barrier layer reduces the transmission rate of one or more components—for example, gases or vapors—through the peelable film. Accordingly, the barrier layer of a film that is made into a package will help to exclude one or more components from the interior of the package—or conversely to maintain one or more gases or vapors within the package.

The barrier layer may include one or more of the following polymers in effective amounts: polyvinyl alcohol, acrylonitrile-butadiene copolymer, polyvinylidene chloride, polyalkylene carbonate, polyacrylonitrile, polypropylene homopolymer or copolymer having a melting point of greater than about 145° C. (as measured by DSC), and polyethylene having a density greater than about 0.95 g/cc. The term "highly crystalline" has a meaning understood to those of skill in the art. A component may be considered "highly crystalline" if the amount of crystalline molecules is at least 70 weight percent of the maximum amount of crystallinity.

If formulated as a gas barrier, the barrier layer preferably has a thickness and composition sufficient to impart to the peelable film an oxygen transmission rate of no more than any of the following 500, 150, 100, 50, 20, 15, and 10 cubic centimeters (at standard temperature and pressure) per square meter per day per 1 atmosphere of oxygen pressure differential measured at 0% relative humidity and 23° C. All references to oxygen transmission rate in this application are measured at these conditions according to ASTM D-3985, which is incorporated herein in its entirety by reference.

The barrier layer thickness may be in any of the following ranges: from about 0.05 to 6 mils, 0.05 to 4 mils, 0.1 to 3 mils, and 0.12 to 2 mils.

Outside Layer "D"

The outside layer (i.e., abuse or print side layer) of the peelable film 20 may be exposed to environmental stresses once the film is formed into a package. Such environmental stresses include abrasion and other abuse during processing and shipment. The outside layer preferably also provides heat-resistant characteristics to the film to help prevent "burn-through" during heat sealing. This is because in forming a package by conductance heat sealing the film to itself, the heat seal layer may be placed in contact with itself, while the outside layer is proximate a heated jaw of a heat sealing apparatus. The heat seal jaw transfers heat through the outside layer to the heat seal layer of the package to soften the heat seal layer and form the heat seal.

Further, the outside layer of the film provides the surface upon which the processor typically applies a printed image (e.g., printed information), such as by printing ink. As such, the outside layer is preferably capable of providing a surface that is compatible with selected print ink systems.

The outside layer may include one or more polyesters, polyamides, polyethylene, and/or polypropylene either alone or in combination, for example, any one of these types of components in an amount of at least 50 weight %, more preferably at least 70%, still more preferably at least 90%, and most preferably 100% by weight of the layer. The outside layer may have any of the following thicknesses: from about 0.05 to about 5 mils, from about 0.3 to about 4 mils, and from about 0.5 to about 3.5 mils.

Tie Layer "E"

The peelable film 20 may include one or more tie layers, which have the primary purpose of improving the adherence of two layers to each other. Tie layers may include polymers having grafted polar groups so that the polymer is capable of covalently bonding to polar polymers such as EVOH. Useful polymers for tie layers include ethylene/unsaturated acid copolymer, ethylene/unsaturated ester copolymer, anhydride-modified polyolefin, polyurethane, and mixtures thereof. Examples of tie layer polymers include one or more of ethylene/vinyl acetate copolymer having a vinyl acetate content of at least 15 weight %, ethylene/methyl acrylate copolymer having a methyl acrylate content of at least 20 weight %, anhydride-modified ethylene/methyl acrylate copolymer having a methyl acrylate content of at least 20%, and anhydride-modified ethylene/alpha-olefin copolymer, such as an anhydride grafted LLDPE.

Modified polymers or anhydride-modified polymers include polymers prepared by copolymerizing an unsaturated carboxylic acid (e.g., maleic acid, fumaric acid), or a derivative such as the anhydride, ester, or metal salt of the unsaturated carboxylic acid with—or otherwise incorporating the same into—an olefin homopolymer or copolymer. Thus, anhydride-modified polymers have an anhydride functionality achieved by grafting or copolymerization.

The peelable film may include a tie layer directly adhered (i.e., directly adjacent) to one or both sides of an internal gas barrier layer. Further, a tie layer may be directly adhered to the internal surface of the outside layer of the film. The tie layers are of a sufficient thickness to provide the adherence function, as is known in the art. Each tie layer may be of a substantially similar or a different composition and/or thickness.

Additives

One or more layers of the peelable film may include one or more additives useful in packaging films, such as, antiblocking agents, slip agents, antifog agents, colorants, pigments, dyes, flavorants, antimicrobial agents, meat preservatives, antioxidants, fillers, radiation stabilizers, and antistatic agents. Such additives, and their effective amounts, are known in the art. The additive in the peelable film should be limited to an amount that does not interfere with the peelable properties of the film to an undesired extent.

Attributes of the Peelable Film

The peelable film of the present invention (e.g., peelable film 12 of FIGS. 1–10 or multiple layer peelable film 20 of FIGS. 5, 7–10) may have any total thickness as long as it provides the desired properties (e.g., flexibility, Young's modulus, optics, seal strength) for a given packaging application of expected use. Useful thicknesses for the peelable film include less than about each of the following: 15 mils, 12 mils, 10 mils, 5 mils, 4 mils, 3 mils, and 2 mils. (A "mil" is equal to 0.001 inch.) Useful thicknesses for the peelable film also include from at least about each of the following: 0.3 mils, 0.5 mils, 0.6 mils, 0.75 mils, 0.8 mils, 0.9 mils, 1 mil, 1.2 mil, 1.4 mil, and 1.5 mil. Useful ranges for the peelable film thickness include from about 0.5 to about 10 mils, from about 0.5 to about 7 mils, and from about 0.5 to about 5 mils.

The peelable film of the present invention preferably exhibits a Young's modulus sufficient to withstand the expected handling and use conditions. Young's modulus may be measured in accordance with one or more of the following ASTM procedures: D882; D5026-95a; D4065-89, each of which is incorporated herein in its entirety by reference. Useful peelable films include those having a Young's modulus of at least each of the following: about 100 MPa, about 200 MPa, about 300 MPa, and about 400 MPa, measured at 100° C. Useful ranges for Young's modulus for the peelable film include from about 70 to about 2000 MPa, from about 100 to about 1000 MPa, and from about 100 to about 500 MPa, measured at a temperature of 100° C.

The peelable film of the present invention may be nonoriented. Alternatively, the peelable film 12 may be oriented in either the machine (i.e., longitudinal), the transverse direction, or preferably in both directions (i.e., biaxially oriented), in order to reduce the permeability and to increase the strength and durability of the film. The peelable film may be oriented in at least one direction by any of the following ratios: at least 2.5:1, from about 2.7:1 to about 10:1, a t least 2.8:1, at least 2.9:1, at least 3.0:1, at least 3.1:1, at least 3.2:1, at least 3.3:1, at least 3.4:1, at least 3.5:1, at least 3.6:1, and at least 3.7:1.

The peelable film of the present invention may be non-heat shrinkable—for example, having a total free shrink at 185° F. (85° C.) of less than about any of the following: 3%, 1%, and 0.5%. Alternatively, the peelable film 12 may be heat shrinkable, for example having a total free shrink at 185° F. (85° C.) of at least about any of the following: 5%, 10%, 15%, 40%, 50%, 55%, 60%, and 65%. The total free shrink at 185° F. (85° C.) may also range from any of the following: 40 to 150%, 50 to 140%, and 60 to 130%. The total free shrink is determined by summing the percent free shrink in the machine (longitudinal) direction with the percentage of free shrink in the transverse direction. For example, a film which exhibits 50% free shrink in the transverse direction and 40% free shrink in the machine direction has a total free shrink of 90%. The peelable film need not have shrinkage in both directions. The free shrink of the film is determined by measuring the percent dimensional change in a 10 cm×10 cm film specimen when subjected to selected heat (i.e., at a certain temperature exposure) according to ASTM D 2732, which is incorporated herein in its entirety by reference.

As is known in the art, a heat-shrinkable film shrinks upon the application of heat while the film is in an unrestrained state. If the film is restrained from shrinking—for example by a packaged good around which the film shrinks—then the tension of the heat-shrinkable film increases upon the application of heat. Accordingly, a heat-shrinkable film that has been exposed to heat so that at least a portion of the film is either reduced in size (unrestrained) or under increased tension (restrained) is considered a heat-shrunk (i.e., heat-contracted) film.

The peelable film of the present invention may exhibit a shrink tension in at least one direction of any of the following: at least 100 psi (689.6 kN/m2), 175 psi (1206.8 kN/m2), from about 175 to about 500 psi (1206.8 to 3448.0 kN/m2), from about 200 to about 500 psi (1379.2 to 3448.0 kN/m2), from about 225 to about 500 psi (1551.6 to 3448.0 kN/m2), from about 250 to about 500 psi (1724.0 to 3448.0 kN/m2), from about 275 to about 500 psi (1896.4 to 3448.0 kN/m2), from about 300 to about 500 psi (2068.8 to 3448.0 kN/m2), and from about 325 to about 500 psi (2241.2 to 3448.0 kN/m2). Shrink tension is measured at 185° F. (85° C.) in accordance with ASTM D 2838, which is incorporated herein in its entirety by reference. The shrink tension of the peelable film should be low enough for a given end use and peelable film construction so as not to induce an undesired or premature peelable seal failure or delamination.

The peelable film 12 may be annealed or heat-set to reduce the free shrink either slightly, substantially, or completely; or the peelable film may not be heat set or annealed once stretched in order that the film will have a high level of heat shrinkability.

One or more of the layers of the peelable film 12 or 20—or at least a portion of the entire peelable film—may be cross-linked to improve the strength of the peelable film, improve the orientation of the peelable film, and help to avoid burn through during heat seal operations. Cross-linking may be achieved by using chemical additives or by subjecting the film layers to one or more energetic radiation treatments—such as ultraviolet, X-ray, gamma ray, beta ray, and high energy electron beam treatment—to induce cross-linking between molecules of the irradiated material. The peelable film may be exposed to any of the following radiation dosages: at least 5, at least 7, at least 10, and at least 15 kGy (kiloGrey). The radiation dosage may also range from 5 to 150, from 5 to 100, and from 5 to 75 kGy.

All or a portion of the peelable film's surface may be corona and/or plasma treated to change the surface energy of the peelable film, for example, to increase the ability of print or a food product to adhere to the peelable film. One type of oxidative surface treatment involves bringing the peelable film into the proximity of an $O_2$- or $N_2$-containing gas (e.g., ambient air) which has been ionized. The peelable film may be treated to have a surface energy of any of the following: at least about 0.034 $J/m^2$, at least about 0.036 $J/m^2$, at least about 0.038 $J/m^2$, and at least about 0.040 $J/m^2$. The corona or plasma treatment of the peelable film should be limited to an amount that does not interfere with the peelable properties of the film to an undesired extent.

Appearance Characteristics of the Peelable Film

The peelable film 12 preferably has low haze characteristics. Haze is a measurement of the transmitted light scattered more than 2.5° from the axis of the incident light. Haze is measured against the outside layer of the peelable film. The "outside layer" is the outer layer of the film that will be adjacent the area outside of the package comprising the film. The "inside layer" is the outer layer of the film that will be adjacent the area inside of the package comprising the film. Haze is measured according to the method of ASTM D 1003, which is incorporated herein in its entirety by reference. All references to "haze" values in this application are by this standard. Preferably, the haze of the peelable film is no more than about (in ascending order of preference) 30%, 25%, 20%, 15%, and 10%; and further preferably the haze is no more than about any of these haze values where the peelable film has a thickness of no more than about 4 mils.

The peelable film 12 has a gloss, as measured against the outside layer of at least about (in ascending order of preference) 40%, 50%, 60%, 63%, 65%, 70%, 75%, 80%, 85%, 90%, and 95%. All references to "gloss" values in this application are in accordance with ASTM D 2457 (60° angle), which is incorporated herein in its entirety by reference.

Preferably, peelable film 12 is transparent (at least in the non-printed regions) so that a packaged article 8 may be visible through the film. "Transparent" means that the film transmits incident light with negligible scattering and little absorption, enabling objects (e.g., the packaged article or print) to be seen clearly through the film under typical viewing conditions (i.e., the expected use conditions of the material).

The measurement of optical properties of plastic films, including the measurement of total transmission, haze, clarity, and gloss, is discussed in detail in Pike, LeRoy, "Optical Properties of Packaging Materials," Journal of Plastic Film & Sheeting, vol. 9, no. 3, pp. 173–80 (July 1993), of which pages 173–80 is incorporated herein by reference.

Manufacture of the Peelable Film

The peelable film 12 may be formed by any of a variety of processes known in the art, including extrusion (e.g., blown-film extrusion, coextrusion, extrusion coating, free film extrusion, and lamination), casting, and adhesive lamination. One or more of these methods may be used to make a multilayer peelable film—that is, a peelable film having two or more layers coextensively bonded or adhered together. Coextrusion manufacture may use, for example, a tubular trapped bubble film process or a flat film (i.e., cast film or slit die) process.

If the peelable film is a cast film, then a relatively lower peel strength range (e.g., from 1 to 2 lb/in) over the heat seal temperature of from 120° C. to 150° C. may be desirable because of the more extensible nature of a cast film relative to a laminated film. This more extensible nature of a cast peelable film may tend to allow some of the peel force to be transferred away from the peelable layer to the adjacent layers. If the peelable film comprises a laminated structure, then a relatively higher peel strength range (e.g., from 1.5 to 2.5 lb/in) over the heat seal temperature of from 120° C. to 150° C. may be desirable.

Substrate

Figure 3:
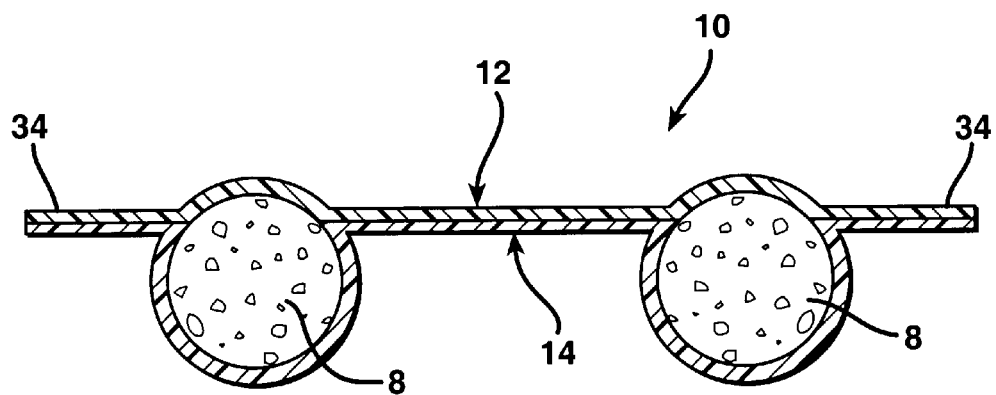
FIG. 3 is a cross-sectional view taken along line 3—3 of FIG. 1.
Figure 6:
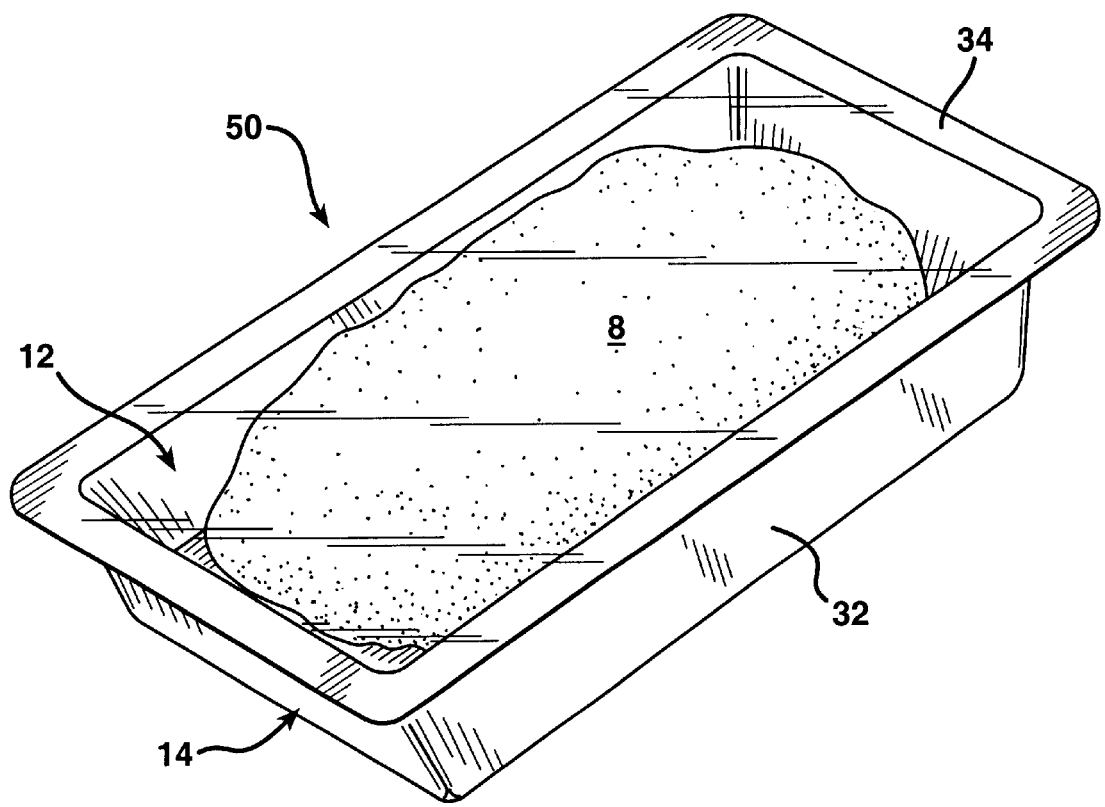
FIG. 6 is a perspective view of a lidded, rigid tray made in accordance with the present invention.
Figure 4:
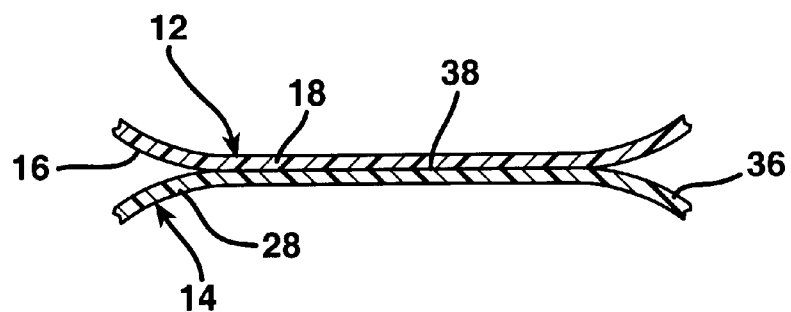
FIG. 4 is a representational sectional view of the top and bottom webs of the package of FIG. 1 as peeling between the webs is initiated.

Although the peelable film 12 may be sealed to itself (not shown) to form a peelably sealed package (for example, as in the VFFS or HFFS packaging methods known in the art), generally the peelable film 12 is sealed to a substrate 14 in one or more selected areas (e.g., perimeter area 34) to form the peelably sealed package 10. Substrate 14 may be flexible or rigid. Substrate 14 may be a monolayer substrate film 28 or a multilayer substrate film 30, such as those thermoplastic films used as the formed web (e.g., "bottom" web) of the thermoforming or vacuum skin packaging methods known in the art. (FIGS. 4–5.) Alternatively, the substrate may include a flexible metal (e.g., aluminum foil) or cellulosic (e.g., paper) flexible substrate.

The substrate 14 may also be a monolayered or multilayered rigid support, such as a plastic or corrugated backing board (not shown), having a surface film layer, coating or other modification to facilitate sealing to the peelable film, or rigid tray 32 having perimeter flange 34 (FIGS. 6–10) with a similar film layer, coating or modification at least in the flange area to facilitate sealing to the peelable film. The rigid trays or supports may be formed from thermoset plastics, thermoplastics (e.g., expanded polystyrene sheet material which has been thermoformed into a desired shape), cellular or foamed plastics (e.g., extruded polystyrene foam sheet), metal, or combinations thereof.

In either the flexible or rigid substrate cases, the substrate 14 preferably has a contact surface layer 36 (e.g., coating or modification) to facilitate heat sealing the substrate 14 to the peelable film 12. If the substrate is monolayered (e.g., uncoated), then the substrate itself may serve as the contact or surface layer 36. At least two types of thermoplastics are in wide use to form the substrate surface layer 36: ionomer and polyethylene. Typical or popular ionomers for use in the substrate surface layer are the same and similar to those discussed above in conjunction with the peelable seal layer. Typical or popular polyethylenes for inclusion in the substrate surface layer include polyethylene homopolymers and copolymers having a density of from about 0.915 to about 0.93 g/cc. (Unless otherwise stated, all densities are at 23° C.) The contact layer may comprise at least 70 weight percent, or at least 80 weight percent of such polyethylene or ionomer.

Polyethylenes having a density of from about 0.915 to about 0.93 g/cc include low density polyethylene ("LDPE"), for example having a density of from about 0.915 to about 0.925 g/cc, linear low density polyethylene ("LLDPE"), for example having a density of from about 0.920 to about 0.930 g/cc, and other heterogeneous or homogeneous ethylene/alpha-olefin copolymers ("EAOs") having a density of from about 0.915 to about 0.93 g/cc. The comonomer of the EAO may be selected from $C_3$ to $C_{10}$ alpha-olefins. The EAO may include at least about 80 weight percent ethylene and less than about 20 weight percent alpha-olefin, preferably at least about 85 weight percent ethylene and less than about 15 weight percent alpha-olefin, more preferably at least about 90 weight percent ethylene and less than about 10 weight percent alpha-olefin.

Polyethylenes of such density may be heterogeneous or homogenous, such as heterogeneous and homogeneous EAOs. As is known in the art, heterogeneous polymers have a relatively wide variation in molecular weight and composition distribution. Heterogeneous polymers may be prepared with, for example, conventional Ziegler Natta catalysts. On the other hand, homogeneous polymers have relatively narrow molecular weight and composition distributions. For example, homogeneous EAOs are structurally different from heterogeneous EAOs in that homogeneous EAOs exhibit: i) a relatively even sequencing of comonomers within a chain, ii) a mirroring of sequence distribution in all chains, and iii) a similarity of length of all chains (i.e., a narrower molecular weight distribution). Furthermore, homogeneous EAOs are typically prepared using metallocene, or other single-site type catalysts, rather than using Ziegler Natta catalysts. Single-site catalysts typically have only one type of catalytic site, which is believed to be the basis for the homogeneity of the polymers resulting from the polymerization. Homogeneous EAOs have molecular weight distributions, expressed as Mw/Mn, of less than about 4, preferably less than about 3, still more preferable less than 2.5, most preferably less than about 2.0. Homogeneous EAOs include long chain branched, linear, and bimodal composition, such as interpenetrating networks (IPN) resins. Homogeneous EAOs may be prepared by solution (preferred), gas phase, supercritical fluid phase, or slurry polymerization. IPNs may be prepared using tandem or mixed catalyst processes.

The substrate has a thickness, strength, and Young's modulus effective for the desired application. Useful substrate thicknesses, strengths, and Young's moduli include those as discussed above in conjunction with the peelable film.

The substrate 14 may be formed by one or more of any of a variety of processes known in the art, including extrusion (e.g., blown-film extrusion, coextrusion, extrusion coating, free film extrusion, and lamination), casting, adhesive lamination, injection molding, compression molding, transfer molding, blow molding, and thermoforming.

Peelably Sealed Packaging

The peelably sealed packaging 10, 50 may be formed by sealing the peelable film 12 to the substrate 14, for example, in the perimeter flange 34 area to enclose an article 8 (e.g., a food item) between the peelable film and the substrate. In doing so, the peelable layer 16 and substrate surface layer 36 may be placed opposite each other and subsequently fused together (FIGS. 4–5, 7) under effective heat sealing conditions—namely, a given heat seal temperature (i.e., heat seal bar or platen temperature), a given heat seal pressure, and a given dwell time effective to form a peelable seal 38, as is known in the art. The peelable seal 38 may form a hermetic seal between the peelable film and the substrate. This may be desirable where the packaged article 8 is a food item, the hermetic peel seal enhancing the protection provided by the peelably sealed packaging. Useful heat sealing conditions include heat seal pressure ranges of from about 30 to about 100 psig and from about 40 to about 80 psig. Useful temperature ranges include from about 100° C. to about 160° C. and from about 120° C. to about 150° C. Useful dwell times include from about 0.3 to about 5 seconds, from about 0.5 seconds to about 3 seconds, and from about 0.5 to about 2 seconds. If a delamination peelable film 26 is sealed to a substrate 14 (FIGS. 8–9), then delamination film layer 24 itself—or one or more additional layers 23—may be sealed to the substrate 14 to create a bond strength greater than that of the interlayer bond strength between peelable layer 16 and the delamination film layer 24 of the peelable film 12.

The minimum heat seal temperature generally effective for heat sealing the peelable layer 16 to a substrate surface layer 36 comprising a polyethylene having a density of from about 0.915 to about 0.93 g/cc to is from about 115° C. to about 120° C.—depending upon the heat seal conditions—because of the melting point and heat seal initiation temperature of the polyethylene. Lower heat seal temperatures, such as about 100° C., may generally be effective for forming a peelable seal where peelable layer 16 comprises ionomer. In general, the desired heat seal temperature ranges from about 120° C. to about 160° C.

Peel Strength

The bond or peel strength of the peelable seal preferably is sufficiently high to withstand the expected use conditions without prematurely failing; yet the bond strength is preferably sufficiently low to achieve an easy open characteristic. The term "peel strength" used in referring to the peel strength of peelable seal 38 is the amount of force required to separate the peelable layer 16 from substrate 14, either by pulling peelable film 12 from substrate 14 or by delaminating peelable film 12 into two portions, as measured in accordance with ASTM F88-94 where the Instron tensile tester crosshead speed is 5 inches per second, using five, 1-inch wide, representative samples. (The term "peel strength" is used in the sense of the maximum peel force required for each sample peel, averaged for five representative samples.) ASTM F88-94 is incorporated herein in its entirety by reference.

The term "peelably sealed" is used to describe the strength of a peelable seal between peelable film 12 and substrate 14 such that the peel or bond strength of the peelable seal 38 formed between the peelable layer 16 and the substrate surface layer 36 is within the range of from about 0.5 pounds per inch width (lb/in) to about 4.5 lb/in in order to facilitate an easy open characteristic. Other useful peelably sealed peel strengths include from about 1 to about 4.5 lb/in, from about 1.5 to about 4.5 lb/in, from about 2 to about 4.5 lb/in, from about 0.5 to about 4 lb/in, from about 0.5 to about 3 lb/in, from about 0.5 to about 2.5 lb/in, from about 0.5 to about 2 lb/in, from about 1 to about 3 lb/in, from about 0.7 to about 2 lb/in, and from about 1 to about 2.5 lb/in.

The term "peelably adhered" is used to describe the strength of the inter-layer adhesion of peelable layer 16 to delamination film layer 24 of the delamination peelable film 26 such that the peel or bond strength of the peelable seal 38 formed between the layers is within the range of from about 0.5 lb/in to about 4.5 lb/in to facilitate an easy open characteristic. (FIGS. 8–9.) Other useful peelably adhered peel strengths are the same as those set forth above with respect to the peelably sealed peel strengths.

Preferably, the peel strength is essentially equivalent (i.e., within about 0.5 lbs/in, more preferably within about 0.3 lbs/in) for the resulting peelable seal of a given thickness of peelable film 12 to a given thickness of substrate 14 for a given effective heat seal condition (i.e., a temperature within the range of from about 120° C. to about 160° C., a pressure, and a dwell time as discussed above), regardless of whether the substrate surface layer 36 is polyethylene having a density of from about 0.915 to about 0.93 g/cc (e.g., consists of a polyethylene having a density of from about 0.915 to about 0.93 g/cc) or is ionomer (e.g., consists of an ionomer copolymer of ethylene and (meth)acrylic acid having at least about 80 weight % ethylene content wherein from about 15% to about 60% of the (meth)acrylic acid groups are neutralized by sodium metal ion). Such essentially equivalent resulting peelable seal peel strengths allow a packager to change the type of substrate for an easy open package without having to significantly change either: 1) the peelable film used to seal to the substrate to form the easy open package or 2) the heat seal conditions under which the peelable seal is made.

Preferably, the peel strength of the peelable seal gradually increases as the heat seal temperature (i.e., the temperature of the heat seal bar or platen) increases. This is useful for at least two reasons. First, the packager is then able to increase the peel strength merely by increasing the heat seal temperature. Second, the packager does not have to monitor the sealing temperature so closely. Otherwise, a relatively small drift or variation in the sealing temperature that may be associated with the sealing equipment may cause a large variation in the peel strength of the peelable seal. Of course, if the heat seal temperature is too high, then an unacceptably high bond strength may occur, such that the seal is not easily hand peelable. "Gradual increases" as used herein means peel strength increases ranging from about 0.2 to about 0.8 lb/in, and preferably from about 0.3 to about 0.6 lb/in, for each 20° F. (11.1° C.) increase in heat seal temperature within the heat seal temperature range of from 120 to 160° C.

Preferably, the peel strength of the peelable seal 38 to a substrate 14—where the substrate surface layer is either polyethylene having a density of from about 0.915 to about 0.93 g/cc or ionomer—is essentially independent of the peelable layer thickness (within a peelable layer thickness of from about 0.05 mil to about 1.25 mil, preferably from about 0.25 to about 1 mil). Also preferably, the peel strength of the peelable seal to a substrate—where the substrate surface layer is either polyethylene having a density of from about 0.915 to about 0.93 g/cc or ionomer—is essentially independent of the peelable film thickness (within a peelable film thickness of from about 1 mil to about 5 mil). In this context, "essentially independent" means that the peel strength does not vary more than about 0.5 lb/in for varied thicknesses, preferably does not vary more than about 0.3 lb/in.

Preferably, the peel strength of the peelable seal to a substrate where the substrate surface layer is either ionomer or polyethylene having a density of from about 0.915 to about 0.93 g/cc ionomer is essentially stable over a 3 month period, preferably over a 7 month period. In this context, "essentially stable" means that the seal strength does not vary more than 0.5 lb/in from the initial peel strength measurement, preferably no more than about 0.3 lb/in.

Where the peelable film is multilayered (i.e., multilayer peelable film 20 or delamination peelable film 26), the peel strength between the peelable layer 16 and the adjacent layer 22 is preferably greater than the peel strength between the peelable layer 16 and the surface layer 36 (FIGS. 5, 7) or the peel strength between the peelable layer 16 and the delamination layer 24 (FIGS. 8–9).

Operation of the Peelably Sealed Packaging

To open peelably sealed packaging 10, the consumer simply grasps a portion (e.g., tab 40) of the peelable film 12 and pulls or "peels" it away from the substrate 14—thereby causing the peelable seal 38 to "fail" and the peelable film 12 to separate from the substrate 14. (FIGS. 1–4.) Likewise, to open peelably sealed rigid tray 50 (FIG. 6), the consumer grasps a portion of peelable film 12 and peels it away from rigid tray 32.

In opening the peelably sealed package, the type of failure for the peelable seal 38 depends on the design and location of the peelable layer 16. If the peelable layer 16 is an inside heat seal layer (FIGS. 5, 7) of the peelable film, then the resulting peel from the substrate 14 is an "interfacial peel" or "surface peel" in which the bond between the peelable layer 16 and the substrate 14 to which it was adhered fails adhesively.

If the peelable layer 16 is an internal layer of the peelable film 20 (FIGS. 8–10), then as the peelable layer is peeled, the peelable film delaminates, so that the delamination peelable film 26 separates between the peelable layer 16 and the delamination layer 24. In so doing, the delamination peelable film 26 may be designed to fail adhesively across its extent, so that the peelable film separates without breaking or tearing the delamination layer 24, which may remain adhered to the substrate 14 (FIG. 9). (In this design, the packaged object 8 may not be available for removal without later removing the remaining film portion adhered to the substrate.) Alternatively, the delamination peelable film 26 may be designed upon peeling to initially fail adhesively between the peelable layer 16 and the delamination layer 24, then once the peel or separation reaches the inside extent of perimeter flange 34, to fail cohesively by tearing through layers 24 and/or 23 (FIG. 10) to allow packaged object 8 to be retrieved from the packaging.

In opening peelably sealed packaging 10 or 50, regardless of the mechanism of the peelable seal failure, preferably the failure will not leave or cause "angel hair" or strings of resin to form between the separated layers or between the peeled film and the substrate.

EXAMPLES

The following examples are presented for the purpose of further illustrating and explaining the present invention and are not to be taken as limiting in any regard. Unless otherwise indicated, all parts and percentages are by weight.

Components of the Examples

ADH=a polyurethane adhesive.
EAO=an ethylene/octene copolymer with a melt index of 1.0 g/10 min and a density of 0.9038 g/cc (ASTM D792).
EMAA1=ethylene/methacrylic acid copolymer having 9% methacrylic acid content and a melt flow index of 2.5 grams/10 minutes.
EMAA2=ethylene/methacrylic acid copolymer having 4% methacrylic acid content and a melt flow index of 3 grams/10 minutes.
EPC1=an ethylene propylene random copolymer with a melt flow index of 2.1 g/10 min and a density of 0.900 g/cc (ASTM D1505).
EPC2=an ethylene propylene random copolymer with a melt flow index of 5.0 to 7.0 g/10 min and a density of 0.902 g/cc.
EVA1=ethylene/vinyl acetate copolymer having 12% vinyl acetate and a melt flow index of 2.5 grams/10 minutes.
EVA2 ethylene/vinyl acetate copolymer having 12% vinyl acetate and a melt flow index of 8 grams/10 minutes.
EVA3=ethylene/vinyl acetate copolymer having 6% vinyl acetate and a melt flow index of 2.6 grams/10 minutes.
EVA4=ethylene/vinyl acetate copolymer having 18% vinyl acetate and a melt flow index of 8 grams/10 minutes.
EVOH=an ethylene/vinyl alcohol copolymer having 38 mole % ethylene content.
HIPS=high impact polystyrene.
ION1=ionomer (sodium salt of ethylene/methacrylic acid copolymer having 15% methacrylic acid with about 59% of the acid groups neutralized) having a melt flow index of 0.9 grams/10 minutes.
ION2=ionomer (zinc salt of ethylene/methacrylic acid copolymer having 12% methacrylic acid with about 38% of the acid groups neutralized) having a melt flow index of 1.8 grams/10 minutes, available from E. I. du Pont de Nemours and Company (Wilmington, Del.) under the trademark SURLYN 1650.
ION3=ionomer (zinc salt of ethylene/methacrylic acid copolymer having 8.7% methacrylic acid with about 18% of the acid groups neutralized) having a melt flow index of 5.2 grams/10 minutes.
ION4=ionomer (zinc salt of ethylene/methacrylic acid copolymer having 12% methacrylic acid at least partially neutralized) having a melt flow index of 1.55 grams/10 minutes and a density of 0.950 g/cc, available from E. I. du Pont de Nemours and Company (Wilmington, Del.) under the trademark SURLYN 1650 SB (having the same neutralization as ION2, but also containing slip additive and silica as antiblock).
LDPE=a low density polyethylene with a melt index of 7.5 g/min and a density of 0.917 g/cc.
MB1=a nylon 6 with talc (magnesium silicate), calcium carbonate, and n, n'-ethylene bis stearamide.
MB2=a nylon 6 with diatomaceous earth and erucamide.
PA1=a nylon 6 resin having a density of 1.135 g/cc.
PA2=an amorphous nylon with a density of 1.18 g/cc.
PA3=a nylon 6 resin having a density of 1.14 g/cc.
PA4=a nylon 6 resin having a density of 1.13 g/cc.
PB1=a blend of about 92 weight % of PB 8640 (see PB3 below) with about 8 weight % LDPE, the composition having a melt flow index of 1.0 gram/10 minutes and a density of 0.915 g/cm3, available from Montell Polyolefins (now Basell) under the tradename PB 1600SA.
PB2=Polybutylene copolymer of butene-1 and ethylene, the copolymer having a melt index of 2.0 gram/10 minutes, a density of 0.908 g/cm3, and a melt point of 116° C., available from Montell Polyolefins (now Basell) under the tradename PB8240.
PB3=Polybutylene (polybutene-1) random copolymer of butene-1 and 1% ethylene having a melt flow index of 1.0 gram/10 minutes and a density of 0.908 g/cm3, available from Montell Polyolefins (now Basell) under the tradename PB8640.
PE1=a homogeneous ethylene/hexene-1 copolymer with a melt index of 4.5 g/10 min and a density of 0.917 g/cc available from Exxon Corporation (Houston, Tex.) under the trademark EXCEED 361C33.
PE2=a homogeneous ethylene/propylene copolymer with a melt index of 1.8 g/10 min and a density of 0.87 g/cc available from Mitsui Petrochemicals, Ltd. (Newark, N.J.) under the trademark TAFMER P-0480.
PET=a biaxially oriented, polyester (polyethylene terephthalate) film having an about 0.1 mil thick vinylidene chloride/methyl methacrylate copolymer layer on the inside surface.
PP1=polypropylene homopolymer having a melt flow index of 3.5 grams/10 minutes.
PP2=polypropylene homopolymer having a melt flow index of 12 grams/10 minutes.
PP3=polypropylene homopolymer having a melt flow index of 33 to 39 grams/10 minutes.

TIE1=an anhydride-grafted polyolefin resin having a density of 0.921 g/cc.
TIE2=an anhydride-grafted polyolefin having a density of 0.943 g/cc.
TIE3=a maleic anhydride-grafted polypropylene having a density of 0.900 g/cc.

Unless otherwise indicated, all melt flow indexes are measured according to ASTM D1238, at a temperature and piston weight as specified according to the material as set forth in the ASTM test method, and all densities are measured according to ASTM D1505. Each of ASTM D792, ASTM D1238, and ASTM D1505 is incorporated herein in its entirety by reference.

TABLE 1

|  | EVA1 | EVA2 | EVA3 | PB1 | PB2 | ION1 | ION2 | ION3 | EMAA1 | EMAA2 | PP1 | PP2 | HIPS |
|---|---|---|---|---|---|---|---|---|---|---|---|---|---|
| Comparative 1 | 100% | | | | | | | | | | | | |
| Comparative 2 | 90% | | | 10% | | | | | | | | | |
| Comparative 3 | 80% | | | 10% | | | | | | | | | 10% |
| Comparative 4 | | 100% | | | | | | | | | | | |
| Comparative 5 | | | | | | | | | 100% | | | | |
| Comparative 6 | | | | 5% | 95% | | | | | | | | |
| Comparative 7 | | 40% | | | | | 60% | | | | | | |
| Comparative 8 | | | | | | | | 100% | | | | | |
| Comparative 9 | 90% | | | | | | | | | | 10% | | |
| Comparative 10 | 50% | | 35% | | | | | | | | 10% | | 5% |
| Comparative 11 | | 75% | | | 20% | | | | | | | 5% | |
| Comparative 12 | | | | | | | | | | 100% | | | |
| Comparative 13 | | | | 5% | | | | | 95% | | | | |
| Comparative 14 | | 20% | | | | | 80% | | | | | | |
| Comparative 15 | | 20% | | | | | 75% | | | | | 5% | |
| Example 1 | | 40% | | 5% | | | 55% | | | | | | |
| Example 2 | | 20% | | 5% | | | 75% | | | | | | |

EXAMPLES 1–2

Each of the films identified in Table 1 was made by the blown film method to form a monolayer film. Each film was prepared using a 1.5 inch Davis Standard extruder, equipped with a general purpose screw, feeding a 2-inch Killion die with a die gap of 0.015 inches. A screen pack combination of 40 mesh/80 mesh/40 mesh was used. The system is fitted with an adjustable collapsing frame and the tower height was set at 30 inches. The screw speed was generally maintained between 20 to 30 revolutions per minute. Haul off speed was maintained at 16 to 17 lineal feet per minute. Film thickness was targeted at 2.0 mils.

Temperature profiles for the extruder were set at: 300° F. in the rear section; 330° F. in the center rear section; 365° F. to 370° F. in the center front section, and 385° F. to 400° F. in the front section. Tackier films were run at the lower temperatures for handling convenience. Temperature profiles for the die were set at: 385° F. to 400° F. at the die bottom; 385° F. to 400° F. at the die center; 385° F. to 400° F. at the top of the die. Tackier films were run at the lower temperature settings for handling convenience.

Each of the films of Table 1 were heat sealed to a 2.0 mil LLDPE substrate film and a 2.0 mil ionomer substrate film. The LLDPE substrate was produced from an ethylene/octene copolymer available from the Dow Chemical Company (Midland, Mich.) under the trademark DOWLEX 2045. The ionomer substrate was produced from a zinc ionomer available from E. I. du Pont de Nemours and Company (Wilmington, Del.) under the trademark SURLYN 1650. Each heat seal sample was produced using a Sentinel Heat Sealer having a 1-inch wide bar, a dwell time of 0.5 seconds, and a bar pressure of 40 pounds per square inch to heat seal the film sample to the substrate sample. The peel strength of the seal between each resulting film and substrate seal specimens was measured on a 1-inch wide strip using an Instron tensile tester with a crosshead speed of 12 inches per minute. The maximum value of force measured was recorded as the peel strength. The results are shown in Table 2.

TABLE 2

Peel Strength vs. Seal Temperature

| | | Heat Seal Temperature: | | | | |
|---|---|---|---|---|---|---|
| | | 93° C. (200° F.) | 104° C. (220° F.) | 116° C. (240° F.) | 138° C. (280° F.) | 149° C. (300° F.) |
| Compare 1 | LLDPE substrate | 25 g/in 0.06 lb/in | 434 g/in 0.96 lb/in | 858 g/in 1.89 lb/in | 1156 g/in 2.55 lb/in | 1229 g/in 2.71 lb/in |
| | Ionomer substrate | 74 g/in 0.16 lb/in | 238 g/in 0.52 lb/in | 667 g/in 1.47 lb/in | 788 g/in 1.74 lb/in | 677 g/in 1.49 lb/in |
| Compare 2 | LLDPE | 15 g/in 0.03 lb/in | 328 g/in 0.73 lb/in | 753 g/in 1.67 lb/in | 1075 g/in 2.38 lb/in | 979 g/in 2.17 lb/in |
| | Ionomer | 51 g/in 0.06 lb/in | 277 g/in 0.61 lb/in | 519 g/in 1.14 lb/in | 550 g/in 1.21 lb/in | 510 g/in 1.12 lb/in |
| Compare 3 | LLDPE | 20 g/in 0.04 lb/in | 334 g/in 0.74 lb/in | 931 g/in 2.05 lb/in | 1035 g/in 2.28 lb/in | 1012 g/in 2.23 lb/in |
| | Ionomer | 78 g/in 0.17 lb/in | 294 g/in 0.65 lb/in | 657 g/in 1.45 lb/in | 1035 g/in 2.28 lb/in | 994 g/in 2.19 lb/in |
| Compare 4 | LLDPE | 196 g/in 0.43 lb/in | 525 g/in 1.16 lb/in | 770 g/in 1.70 lb/in | 1012 g/in 2.23 lb/in | 1107 g/in 2.44 lb/in |
| | Ionomer | 95 g/in 0.21 lb/in | 360 g/in 0.79 lb/in | 691 g/in 1.52 lb/in | 729 g/in 1.61 lb/in | 781 g/in 1.72 lb/in |
| Compare 5 | LLDPE | 11 g/in 0.02 lb/in | 69 g/in 0.15 lb/in | 627 g/in 1.38 lb/in | 1215 g/in 2.68 lb/in | 1238 g/in 2.73 lb/in |
| | Ionomer | 240 g/in 0.53 lb/in | 974 g/in 2.15 lb/in | 1624 g/in 3.58 lb/in | 1694 g/in 3.73 lb/in | 1815 g/in 4.00 lb/in |
| Compare 6 | LLDPE | 11 g/in 0.02 lb/in | 11 g/in 0.02 lb/in | 12 g/in 0.03 lb/in | 120 g/in 0.26 lb/in | 148 g/in 0.33 lb/in |
| | Ionomer | 82 g/in 0.18 lb/in | 436 g/in 0.96 lb/in | 581 g/in 1.28 lb/in | 695 g/in 1.53 lb/in | 668 g/in 1.47 lb/in |
| Compare 7 | LLDPE | 14 g/in 0.03 lb/in | 86 g/in 0.19 lb/in | 350 g/in 0.77 lb/in | 733 g/in 1.61 lb/in | 868 g/in 1.91 lb/in |
| | Ionomer | 30 g/in 0.07 lb/in | 140 g/in 0.31 lb/in | 364 g/in 0.80 lb/in | 438 g/in 0.96 lb/in | 417 g/in 0.92 lb/in |
| Compare 8 | LLDPE | 15 g/in 0.03 lb/in | 24 g/in 0.05 lb/in | 266 g/in 0.59 lb/in | 1462 g/in 3.22 lb/in | 1713 g/in 3.77 lb/in |
| | Ionomer | 118 g/in 0.26 lb/in | 838 g/in 1.85 lb/in | 1759 g/in 3.87 lb/in | 1922 g/in 4.23 lb/in | 1930 g/in 4.25 lb/in |
| Compare 9 | LLDPE | 21 g/in 0.15 lb/in | 465 g/in 1.02 lb/in | 871 g/in 1.92 lb/in | 1265 g/in 2.79 lb/in | 1345 g/in 2.96 lb/in |
| | Ionomer | 82 g/in 0.18 lb/in | 282 g/in 0.62 lb/in | 691 g/in 1.52 lb/in | 725 g/in 1.60 lb/in | 803 g/in 1.77 lb/in |
| Compare 10 | LLDPE | 13 g/in 0.03 lb/in | 94 g/in 0.21 lb/in | 451 g/in 0.99 lb/in | 1390 g/in 3.06 lb/in | 1291 g/in 2.84 lb/in |
| | Ionomer | 44 g/in 0.10 lb/in | 285 g/in 0.63 lb/in | 460 g/in 1.01 lb/in | 553 g/in 1.22 lb/in | 581 g/in 1.28 lb/in |
| Compare 11 | LLDPE | 20 g/in 0.04 lb/in | 275 g/in 0.61 lb/in | 589 g/in 1.30 lb/in | 1056 g/in 2.33 lb/in | 1090 g/in 2.40 lb/in |
| | Ionomer | 89 g/in 0.20 lb/in | 278 g/in 0.61 lb/in | 378 g/in 0.83 lb/in | 444 g/in 0.98 lb/in | 447 g/in 0.98 lb/in |
| Compare 12 | LLDPE | 15 g/in 0.03 lb/in | 17 g/in 0.04 lb/in | 410 g/in 0.90 lb/in | 1336 g/in 2.94 lb/in | 1517 g/in 3.34 lb/in |
| | Ionomer | 12.3 g/in 0.03 lb/in | 128 g/in 0.28 lb/in | 907 g/in 2.00 lb/in | 1429 g/in 3.15 lb/in | 1496 g/in 3.30 lb/in |
| Compare 13 | LLDPE | 12 g/in 0.03 lb/in | 27 g/in 0.06 lb/in | 382 g/in 0.84 lb/in | 1270 g/in 2.80 lb/in | 1276 g/in 2.81 lb/in |
| | Ionomer | 151 g/in 0.33 lb/in | 810 g/in 1.78 lb/in | 1414 g/in 3.11 lb/in | 1533 g/in 3.38 lb/in | 1561 g/in 3.44 lb/in |
| Compare 14 | LLDPE | 12 g/in 0.03 lb/in | 33 g/in 0.07 lb/in | 34 g/in 0.07 lb/in | 340 g/in 0.75 lb/in | 641 g/in 1.41 lb/in |
| | Ionomer | 89 g/in 0.20 lb/in | 159 g/in 0.35 lb/in | 188 g/in 0.41 lb/in | 221 g/in 0.49 lb/in | 279 g/in 0.61 lb/in |
| Compare 15 | LLDPE | 14 g/in 0.03 lb/in | 21 g/in 0.05 lb/in | 46 g/in 0.10 lb/in | 272 g/in 0.60 lb/in | 469 g/in 1.03 lb/in |
| | Ionomer | 27 g/in 0.06 lb/in | 238 g/in 0.52 lb/in | 388 g/in 0.85 lb/in | 540 g/in 1.19 lb/in | 586 g/in 1.29 lb/in |
| Example 1 | LLDPE | 22 g/in 0.05 lb/in | 187 g/in 0.41 lb/in | 593 g/in 1.31 lb/in | 1040 g/in 2.29 lb/in | 858 g/in 1.89 lb/in |
| | Ionomer | 42 g/in 0.09 lb/in | 207 g/in 0.46 lb/in | 580 g/in 1.28 lb/in | 820 g/in 1.81 lb/in | 710 g/in 1.56 lb/in |
| Example 2 | LLDPE | 12 g/in 0.03 lb/in | 37 g/in 0.08 lb/in | 110 g/in 0.24 lb/in | 490 g/in 1.08 lb/in | 594 g/in 1.31 lb/in |
| | Ionomer | 83 g/in 0.18 lb/in | 248 g/in 0.55 lb/in | 341 g/in 0.75 lb/in | 491 g/in 1.08 lb/in | 459 g/in 1.01 lb/in |

The peel strength of the peelable seals formed by Examples 1 and 2 with the LLDPE substrate (having a polyethylene surface layer) and the ionomer substrate (having an ionomer surface layer) were "essentially equivalent" (as that term is discussed in the "Peel Strength" section above).

Substrate Webs

The following substrate webs (Ionomer Substrate Webs 1–2 and PE Substrate Webs 1–2) were formed by the annular cast film extrusion method so that each final substrate web had the thickness and layers shown below:

|  | Layer Composition (Weight %) | Percent of total substrate web thickness: |
|---|---|---|
| Ionomer Substrate Web 1 | | |
| (5 mil total thickness) | | |
| Layer 1 | PA3 (96%), MB1 (2%), MB2 (2%) | 13% |
| Layer 2 | TIE2 (100%) | 25% |
| Layer 3 | PA1 (80%), PA2 (20%) | 7% |
| Layer 4 | EVOH (100%) | 8% |
| Layer 5 | PA1 (80%), PA2 (20%) | 6% |
| Layer 6 | TIE1 (100%) | 8% |
| Layer 7 | PE1 (55%), LDPE (10%), PE2 (35%) | 25% |
| Layer 8 (substrate surface layer) | ION4 (100%) | 8% |
| Ionomer Substrate Web 2 | | |
| (4 mil total thickness) | | |
| Layers 1–8 | Same as layers 1–8 of Ionomer Substrate Web 1 | Same as layers 1–8 of Ionomer Substrate Web 1 |
| PE Substrate Web 1 | | |
| (5 mil total thickness) | | |
| Layers 1–6 | Same as Layers 1–6 as in Ionomer Substrate Web above | Same as Layers 1–6 in Ionomer Substrate Web above |
| Layer 7 | PE1 (90%), LDPE (10%) | 25% |
| Layer 8 (substrate surface layer) | PE1 (88%), LDPE (10%), antiblock (silica) in LDPE carrier (2%) | 8% |
| PE Substrate Web 2 | | |
| (3.5 mil total thickness) | | |
| Layer 1 | PP3 (100%) | 10% |
| Layer 2 | EPC2 (100%) | 14% |
| Layer 3 | TIE3 (100%) | 7% |
| Layer 4 | PA4 (100%) | 13% |
| Layer 5 | EVOH (100%) | 10% |
| Layer 6 | PA4 (100%) | 13% |
| Layer 7 | TIE1 (100%) | 8% |
| Layer 8 (substrate surface layer) | PE1 (88%), LDPE (10%), antiblock (silica) in LDPE carrier (2%) | 25% |

EXAMPLES 3–8

Peelable films of the present invention were made as laminates having the following layers:

Example 3

Peelable Film, Laminate 2.66 mil Total Thickness

|  | Layer Composition (Weight %) | Layer thickness: |
|---|---|---|
| Layer 1 | PET (100%) | 0.56 mil |
| Layer 2 | ADH (100%) | 0.1 mil |
| Layer 3 | EPC1 (80%), EAO (20%) | 1 mil |
| Layer 4 | EAO (100%) | 0.5 mil |
| Layer 5 (peelable layer, heat seal layer) | ION2 (65%), EVA2 (30%), PB3 (5%) | 0.5 mil |

Example 4

Peelable Film, Laminate 3.66 mil Total Thickness

|  | Layer Composition (Weight %) | Layer thickness: |
|---|---|---|
| Layer 1 | PET (100%) | 0.56 mil |
| Layer 2 | ADH | 0.1 mil |
| Layer 3 | EPC1 (80%), EAO (20%) | 1.5 mil |
| Layer 4 | EAO (100%) | 0.75 mil |
| Layer 5 (peelable layer, heat seal layer) | ION2 (65%), EVA2 (30%), PB3 (5%) | 0.75 mil |

Example 5

Peelable Film, Laminate 2.66 mil Total Thickness

|  | Layer Composition (Weight %) | Layer thickness: |
|---|---|---|
| Layer 1 | PET (100%) | 0.56 mil |
| Layer 2 | ADH (100%) | 0.1 mil |
| Layer 3 | EPC1 (80%), EAO (20%) | 1 mil |
| Layer 4 | EAO (100%) | 0.5 mil |
| Layer 5 (peelable layer, heat seal layer) | ION2 (55%), EVA2 (40%), PB3 (5%) | 0.5 mil |

Example 6

Peelable Film, Laminate 3.66 mil Total Thickness

|  | Layer Composition (Weight %) | Layer thickness: |
|---|---|---|
| Layer 1 | PET (100%) | 0.56 mil |
| Layer 2 | ADH (100%) | 0.1 mil |
| Layer 3 | EPC1 (80%), EAO (20%) | 1.5 mil |
| Layer 4 | EAO (100%) | 0.75 mil |
| Layer 5 (peelable layer, heat seal layer | ION2 (55%), EVA2 (40%), PB3 (5%) | 0.75 mil |

Example 7

Peelable Film, Laminate 2.66 mil Total Thickness

| | Layer Composition (Weight %) | Layer thickness: |
|---|---|---|
| Layer 1 | PET (100%) | 0.56 mil |
| Layer 2 | ADH (100%) | 0.1 mil |
| Layer 3 | EPC1 (80%), EAO (20%) | 1 mil |
| Layer 4 | EAO (100%) | 0.5 mil |
| Layer 5 (peelable layer, heat seal layer) | ION2 (45%), EVA2 (40%), EVA4 (10%), PB3 (5%) | 0.5 mil |

Example 8

Peelable Film, Laminate 2.66 mil Total Thickness

| | Layer Composition (Weight %) | Layer thickness: |
|---|---|---|
| Layer 1 | PET (100%) | 0.56 mil |
| Layer 2 | ADH (100%) | 0.1 mil |
| Layer 3 | EPC1 (80%), EAO (20%) | 1 mil |
| Layer 4 | EAO (100%) | 0.5 mil |
| Layer 5 (peelable layer, heat seal layer) | ION2 (65%), EVA2 (30%), PB3 (5%) | 0.5 mil |

(Note: Examples 3 and 8 have the same composition, but were made at different times.)

Layers 3–5 were formed by blown-film extrusion, then layer 3 was adhesively laminated to layer 1 to form the five-layer peelable film (laminate).

Layer 5 of each of the peelable films of Examples 3 and 4—and also of Example 3 film aged seven months at room temperature—was sealed to the Layer 8 of the Ionomer Substrate Web 1 or the PE Substrate Web 1 using a Sencorp Heat Sealer model 12AS/1. This Sencorp Heat Sealer is a bar heat sealer useful in forming test specimens. This Sencorp Heat Sealer used a heated upper bar or jaw and an unheated lower bar. The Sencorp Heat Sealer operated having the heat seal temperature shown in Table 3 (i.e., upper heat seal bar temperature) for a dwell time of 2 seconds and a seal bar closing pressure of 80 psig. Five representative 1-inch wide strips were cut from each heat-sealed packaging specimen. The peel strength for each of these 5 samples was measured according to ASTM F88-94 where the Instron tensile tester crosshead speed is 5 inches per second. The maximum peel force required for each sample peel was averaged for the five representative samples and the number reported as the peel strength below in Table 3. None of the peelably-sealed packaging samples exhibited angel hair or stringers as the peelable film was peeled from the substrate.

TABLE 3

Peel Strength (lb/in) vs. Seal Temperature

| Peelable film | Substrate | Heat Seal Temperature: | | | | | | |
|---|---|---|---|---|---|---|---|---|
| | | 100° C. | 110° C. | 120° C. | 130° C. | 140° C. | 150° C. | 160° C. |
| Ex 3 | PE Web 1 | 0.31 | 1.03 | 1.31 | 1.43 | 1.68 | 1.86 | 1.98 |
| | Ionomer Web 1 | 0.73 | 0.96 | 1.22 | 1.45 | 1.61 | 1.83 | 1.77 |
| Ex 3 (aged 7 months) | PE Web 1 | 0.24 | 0.88 | 1.28 | 1.46 | 1.40 | 1.90 | 1.96 |
| | Ionomer Web 1 | 0.57 | 0.86 | 1.11 | 1.28 | 1.54 | 1.93 | 1.88 |
| Ex 4 | PE Web 1 | 0.22 | 1.01 | 1.32 | 1.46 | 1.61 | 1.78 | 1.91 |
| | Ionomer Web 1 | 0.66 | 0.90 | 1.06 | 1.19 | 1.42 | 1.66 | 1.65 |

Examples 3 and 4 had an average haze (as measured against layer 1) of 13% and 12%, respectively.

The results in Table 3 show that the peel strengths for the peelable film Example 3 where the peelable film was aged over seven months are essentially stable relative to the non-aged counterpart because the peel strength changes over this time were all less than 0.28 lb/in (i.e., 1.68 lb/in minus 1.40 lb/in).

The results in Table 3 also show that the peel strengths for Example 3 (having a peelable layer of 0.5 mils) and Example 4 (having a peelable layer of 0.75 mils) were essentially independent of the peelable layer thickness, because the peel strength differences were all less than 0.26 lb/in (1.45 lb/in minus 1.19 lb/in). This maximum 0.26 lb/in difference also indicates that the peel strengths for Example 3 (having a peelable film thickness of 2.66 mils) and Example 4 (having a peelable film thickness of 3.66 mils) were also essentially independent of the peelable film thickness.

Table 3 also indicates that the peel strengths of the peelable seal formed between Examples 3 or 4 with either the PE Substrate Web 1 (having a polyethylene surface layer) or the Ionomer Substrate Web 1 (having an ionomer surface layer) were essentially equivalent, because the largest peel strength difference at a given heat seal temperature in the range of 120° C. to 160° C. was 0.27 lb/in (i.e., 1.46 lb/in minus 1.19 lb/in).

Layer 5 of each of the peelable films of Examples 5–8 was sealed to the Layer 8 of the Ionomer Substrate Web 2 or the PE Substrate Web 2 using a Multivac Packaging Equipment Company Model R7000 Horizontal Form-Fill-Seal (HFFS) machine operating without vacuum. The HFFS sealer operated with an upper seal bar or platen at the heat seal temperature shown in Table 4 for a dwell time of 2 seconds and a seal bar closing pressure of 80 psig. (The bottom platen is not heated.) Five representative 1-inch wide strips were cut from each heat-sealed packaging specimen. The peel strength for each of these 5 samples was measured according to ASTM F88-94 where the Instron tensile tester crosshead speed is 5 inches per second. The maximum peel force required for each sample peel was averaged for the five representative samples and the number reported as the peel strength below in Table 4. None of the peelably-sealed packaging samples exhibited angel hair or stringers as the peelable film was peeled from the substrate.

TABLE 4

Peel Strength (lb/in) vs. Seal Temperature

| Peelable film | Substrate | Heat Seal Temperature: | | |
|---|---|---|---|---|
| | | 100° C. | 125° C. | 150° C. |
| Ex 5 | PE Web 2 | 0.37 | 1.22 | 2.12 |
| | Ionomer Web 2 | 0.95 | 1.57 | 1.81 |
| Ex 6 | PE Web 2 | 0.41 | 1.31 | 1.64 |
| | Ionomer Web 2 | 0.5 | 1.35 | 1.62 |
| Ex 7 | PE Web 2 | 0.63 | 1.32 | 2.30 |
| | Ionomer Web 2 | 0.87 | 1.56 | 2.10 |
| Ex 8 | PE Web 2 | 0.32 | 1.13 | 1.76 |
| | Ionomer Web 2 | 0.73 | 1.59 | 1.80 |

Examples 5–8 had an average haze (as measured against layer 1) of 21%, 23%, 42%, and 14%, respectively, The results in Table 4 show that the peel strengths for Example 5 (having a peelable layer of 0.5 mils) and Example 6 (having a peelable layer of 0.75 mils) were essentially independent of the peelable layer thickness, because the peel strength differences were all less than 0.48 lb/in (2.12 lb/in minus 1.64 lb/in). This maximum 0.48 lb/in difference also indicates that the peel strengths for Example 5 (having a peelable film thickness of 2.66) and Example 6 (having a peelable film thickness of 3.66) were also essentially independent of the peelable film thickness.

Table 4 also indicates that the peel strengths of the peelable seal formed between Examples 5, 6, 7, or 8 with either the PE Substrate Web 2 (having a polyethylene surface layer) or the Ionomer Substrate Web 2 (having an ionomer surface layer) were essentially equivalent, because the largest peel strength difference at a given heat seal temperature in the range of 120° C. to 160° C. was 0.46 lb/in (i.e., 1.59 lb/in minus 1.13 lb/in).

Examples 9–11

The following peelable films of the present invention were made as cast extruded films having the following layers:

Example 9

Peelable Film 3.5 mil Total Thickness

| | Layer Composition (Weight %) | Percent of total thickness: |
|---|---|---|
| Layer 1 | PA3 (96%), MB1 (2%), MB2 (2%) | 8% |
| Layer 2 | TIE2 (100%) | 31% |
| Layer 3 | PA1 (80%), PA2 (20%) | 9% |

-continued

| | Layer Composition (Weight %) | Percent of total thickness: |
|---|---|---|
| Layer 4 | EVOH (100%) | 8% |
| Layer 5 | PA1 (80%), PA2 (20%) | 9% |
| Layer 6 | TIE1 (100%) | 8% |
| Layer 7 | PE1 (55%), LDPE (10%), PE2 (35%) | 19% |
| Layer 8 (peelable layer) | ION2 (55%), EVA2 (35%), PB3 (10%) | 8% |

Example 10

Peelable Film 3.5 mil Total Thickness

| | Layer Composition (Weight %) | Percent of total thickness: |
|---|---|---|
| Layers 1–7 | Same as Layers 1–7 as in Ex AA | Same as Layers 1–7 in Ex AA |
| Layer 8 (peelable layer) | ION2 (63%), EVA2 (30%), PB3 (7%) | 8% |

Example 11

Peelable Film 3.5 mil Total Thickness

| | Layer Composition (Weight %) | Percent of total thickness: |
|---|---|---|
| Layers 1–7 | Same as Layers 1–7 as in Ex AA | Same as Layers 1–7 in Ex AA |
| Layer 8 (peelable layer) | ION2 (60%), EVA2 (30%), PB3 (10%) | 8% |

Layer 8 of each of the peelable films of Examples 9–11 was sealed to the Layer 8 of the Ionomer Substrate Web 1 or the PE Substrate Web 1 (described above) using the Multivac HFFS machine as described with respect to Examples 5–8 above to form samples under the same conditions and procedures as discussed there. The results were averaged for each sample type. The results are shown in Table 5. The resulting the peel strength measurements are reported in Table 5.

TABLE 5

Peel Strength (lb/in) vs. Seal Temperature

| Peelable film | Substrate | Heat Seal Temperature: | | | |
|---|---|---|---|---|---|
| | | 100° C. | 120° C. | 140° C. | 160° C. |
| Ex 9 | PE Web 1 | 0.18 | 1.64 | 2.15 | 2.48 |
| | Ionomer Web 1 | 1.05 | 1.69 | 2.07 | 2.55 |
| Ex 10 | PE Web 1 | 0.09 | 1.88 | 2.31 | 2.95 |
| | Ionomer Web 1 | 1.12 | 1.79 | 2.41 | 3.01 |
| Ex 11 | PE Web 1 | <0.05 | 1.34* | 2.29 | 2.34 |
| | Ionomer Web 1 | 1.48 | 1.93 | 2.11 | 2.34 |

TABLE 5-continued

Peel Strength (lb/in) vs. Seal Temperature

| Peelable film | Substrate | Heat Seal Temperature: | | | |
|---|---|---|---|---|---|
| | | 100° C. | 120° C. | 140° C. | 160° C. |

*It is suspected that the 120° C. seal bar temperature for these samples was not actually obtained (i.e., not properly equilibrated) resulting in an ineffective melting or softening of the polyethylene and accordingly a below actual peel strength.

Example 12

The following peelable film of the present invention was made as a coextruded cast film having the following layers:

Example 12

Peelable Film 4 mils in Total Thickness

| | Layer Composition (Weight %) | Percent of total thickness: |
|---|---|---|
| Layer 1 | PA3 (96%), MB1 (2%), MB2 (2%) | 8% |
| Layer 2 | TIE2 (100%) | 31% |
| Layer 3 | PA1 (80%), PA2 (20%) | 9% |
| Layer 4 | EVOH (100%) | 8% |
| Layer 5 | PA1 (80%), PA2 (20%) | 9% |
| Layer 6 | TIE1 (100%) | 8% |
| Layer 7 | PE1 (55%), LDPE (10%), PE2 (35%) | 19% |
| Layer 8 (peelable layer) | ION2 (65%), EVA2 (30%), PB3 (5%) | 8% |

Layer 8 of the peelable film of Example 12 was sealed to Layer 8 of the Ionomer Substrate Web 2 or the PE Substrate Web 2 (described above) using the Multivac HFFS machine as described with respect to Examples 5–8 above to form samples under the same conditions and procedures as discussed there. The results were averaged for each sample type. The resulting the peel strength measurements are reported in Table 6. None of the peelably-sealed packaging samples exhibited angel hair or stringers as the peelable film was peeled from the substrate.

TABLE 6

Peel Strength (lb/in) vs. Seal Temperature

| Peelable film | Substrate | Heat Seal Temperature: | | |
|---|---|---|---|---|
| | | 100° C. | 125° C. | 150° C. |
| Ex 12 | PE Web 2 | 0.11 | 2.60 | 3.30 |
| | Ionomer Web 2 | 0.30 | 2.40 | 3.40 |

Table 6 shows that the peel strengths of the peelable seal formed between Example 12 with either the PE Substrate Web 2 (having a polyethylene surface layer) or the Ionomer Substrate Web 2 (having an ionomer surface layer) were essentially equivalent, because the largest peel strength difference at a given heat seal temperature in the range of 125° C. to 150° C. was 0.20 lb/in (i.e., 2.60 lb/in minus 2.40 lb/in).

The above descriptions are those of preferred embodiments of the invention. Various alterations and changes can be made without departing from the spirit and broader aspects of the invention as defined in the claims, which are to be interpreted in accordance with the principles of patent law, including the doctrine of equivalents. Except in the claims and the specific examples, or where otherwise expressly indicated, all numerical quantities in this description indicating amounts of material, reaction conditions, use conditions, molecular weights, and/or number of carbon atoms, and the like, are to be understood as modified by the word "about" in describing the broadest scope of the invention. Any reference to an item in the disclosure or to an element in the claim in the singular using the articles "a," "an," "the," or "said" is not to be construed as limiting the item or element to the singular unless expressly so stated. Unless otherwise indicated, all parts and percentages in this application are by weight.

What is claimed is:

1. A peelably sealed package, the package comprising:
   a web comprising a peelable layer comprising a blend of:
      from about 3 to about 15 weight parts polybutylene;
      from about 40 to about 75 weight parts ionomer; and
      from about 20 to about 55 weight parts ethylene/unsaturated ester copolymer wherein the unsaturated ester comprises an alkyl ester of acrylic or methacrylic acid, where the alkyl ester has from 4 to 12 carbon atoms; and
   a substrate comprising a surface layer comprising a polymer selected from the group consisting of polyethylene having a density of from about 0.915 to about 0.93 g/cc, ionomer, and mixtures thereof, wherein the peelable layer of the web and the surface layer of the substrate are peelably sealed to each other in one or more selected areas.

2. The peelably sealed package of claim 1 wherein the peelable layer of the web and the surface layer of the substrate form a peelable seal having a peel strength of from about 0.5 to about 4.5 lb/in.

3. The peelably sealed package of claim 1 wherein the peelable layer of the web and the surface layer of the substrate form a peelable seal having a peel strength of from about 1 to about 4 lb/in.

4. The peelably sealed package of claim 1 wherein the peelable layer of the web and the surface layer of the substrate form a peelable seal having a peel strength of from about 1 to about 2.5 lb/in.

5. The peelably sealed package of claim 1 wherein the peelable layer of the web and the surface layer of the substrate form a peelable seal having a peel strength of from about 0.7 to about 2 lb/in.

6. The peelably sealed package of claim 1 wherein the peelable layer of the web and the surface layer of the substrate form a peelable seal that is capable of remaining essentially stable over a 3 month period.

7. The peelably sealed package of claim 1 wherein:
   the peelable layer of the web and the surface layer of the substrate form a peelable seal having a peel strength;
   the web further comprises a second layer adjacent the peelable layer and having a given peel strength between the peelable layer and the second layer, the second layer comprising a thermoplastic; and
   the peel strength between the peelable layer and the second layer is greater than the peel strength between the peelable layer and the surface layer.

8. The peelably sealed package of claim 1 wherein the peelable layer comprises from about 5 to about 12 weight parts polybutylene.

9. The peelably sealed package of claim 1 wherein the peelable layer comprises polybutylene having a comonomer content of less than about 4 weight %.

10. The peelably sealed package of claim 1 wherein the polybutylene comprises nonelastomeric polybutylene.

11. The peelably sealed package of claim 1 wherein the peelable layer comprises from about 45 to about 70 weight parts ionomer.

12. The peelably sealed package of claim 1 wherein the ionomer of the peelable layer comprises a copolymer of ethylene and (meth)acrylic acid having at least about 80 weight % ethylene content wherein from about 15% to about 60% of the (meth)acrylic acid groups are neutralized by a metal ion selected from the group consisting of sodium, zinc, or combinations thereof.

13. The peelable sealed package of claim 1 wherein the peelable layer comprises from about 30 to 55 weight parts ethylene/unsaturated ester copolymer.

14. The peelably sealed package of claim 1 wherein the ethylene/unsaturated ester copolymer includes from about 6 to about 18 weight % unsaturated ester.

15. The peelably sealed package of claim 1 wherein the ethylene/unsaturated ester copolymer includes from about 8 to about 12 weight % unsaturated ester.

16. The peelably sealed package of claim 1 wherein the ethylene/unsaturated ester comprises an ethylene/alkyl (meth)acrylate copolymer having from about 6 to about 18 weight % alkyl (meth)acrylate content, the alkyl (meth)acrylate having from 4 to 6 carbon atoms.

17. The peelably sealed package of claim 1 wherein the substrate comprises a surface layer comprising at least about 80 weight % of a polyethylene having a density of from about 0.915 to about 0.93 g/cc.

18. The peelably sealed package of claim 1 wherein the substrate comprises a surface layer comprising at least about 80 weight % of an ionomer.

19. The peelably sealed package of claim 1 wherein the web has a thickness of no more than about 4 mils and haze of no more than about 30%.

20. The peelably sealed package of claim 1 further comprising an article enclosed between the web and substrate.

21. The peelably sealed package of claim 1 wherein the peelable layer of the web and the surface layer of the substrate form a hermetic peelable seal.

22. The peelably sealed package of claim 1 wherein the substrate is rigid.

23. The peelably sealed package of claim 1 wherein the substrate is flexible.

24. The peelably sealed package of claim 1 wherein the substrate has a Young's modulus of from about 70 to about 2000 MPa, measured at 100° C.

25. The peelably sealed package of claim 1 wherein the peelable film has a Young's modulus of from about 70 to about 2000 MPa, measured at 100° C.

26. A method of packaging comprising:
placing an article between the web and the substrate of claim 1; and
peelably sealing the peelable layer of the web to the surface layer of the substrate to enclose the article between the web and substrate.

27. A peelably sealed package, the package comprising:
a web having a Young's modulus of from about 70 to about 2000 MPa, measured at 100° C., a thickness of no more than about 4 mils, and a haze of no more than about 30%, the web comprising a peelable layer comprising a blend of:
from about 5 to about 12 weight % nonelastomeric polybutylene having a comonomer content of less than about 4 weight %;
from about 45 to about 70 weight % ionomer comprising a copolymer of ethylene and (meth)acrylic acid having at least about 80 weight % ethylene content wherein from about 15% to about 60% of the (meth) acrylic acid groups are neutralized by a metal ion selected from the group consisting of sodium, zinc, or combinations thereof; and
from about 35 to about 55 weight % ethylene/vinyl acetate copolymer having from about 6 to about 18 weight % vinyl acetate content; and
a substrate comprising a surface layer comprising at least about 80 weight % of a polymer selected from the group consisting of polyethylene having a density of from about 0.915 to about 0.93 g/cc, ionomer, and mixtures thereof; and
an article enclosed between the web and substrate, wherein the peelable layer of the web and the surface layer of the substrate are peelably sealed to each other in one or more selected areas to form a hermetic peelable seal having a peel strength of from about 1 to about 4 lb/in.

28. A thermoplastic, multilayer packaging film comprising at least one layer comprising a blend of:
from about 3 to about 15 weight parts polybutylene;
from about 40 to about 75 weight parts ionomer; and
from about 20 to about 55 weight parts ethylene/unsaturated ester copolymer wherein the unsaturated ester is selected from the group consisting of vinyl esters of aliphatic carboxylic acids, where the vinyl esters have from 5 to 12 carbon atoms, and alkyl esters of acrylic or methacrylic acid, where the alkyl esters have from 4 to 12 carbon atoms.

29. The film of claim 28 wherein the at least one layer comprises from about 5 to about 12 weight parts polybutylene, from about 45 to about 70 weight parts ionomer, and from about 30 to 55 weight parts ethylene/unsaturated ester copolymer.

30. The film of claim 28 wherein the at least one layer comprises nonelastomeric polybutylene having a non-butylene comonomer content of less than about 4 weight %.

31. The film of claim 28 wherein the ionomer of the at least one layer comprises a copolymer of ethylene and (meth)acrylic acid having at least about 80 weight % ethylene content wherein from about 15% to about 60% of the (meth)acrylic acid groups are neutralized by a metal ion selected from the group consisting of sodium, zinc, or combinations thereof.

32. The film of claim 28 wherein the ethylene/unsaturated ester copolymer includes from about 6 to about 18 weight % unsaturated ester.

33. The film of claim 28 wherein the ethylene/unsaturated ester copolymer includes from about 8 to about 12 weight % unsaturated ester.

34. The film of claim 28 wherein the unsaturated ester comprises an alkyl ester of acrylic or methacrylic acid, the alkyl ester having from 4 to 12 carbon atoms.

35. The film of claim 28 wherein the unsaturated ester comprises a vinyl ester of aliphatic carboxylic acid, the vinyl ester having from 5 to 12 carbon atoms.

36. The film of claim 28 wherein the ethylene/unsaturated ester comprises from about 6 to about 18 weight % vinyl ester content.

37. The film of claim 28 wherein the ethylene/unsaturated ester comprises an ethylene/alkyl (meth)acrylate copolymer having from about 6 to about 18 weight % alkyl (meth) acrylate content, the alkyl (meth)acrylate having from 4 to 6 carbon atoms.

38. The film of claim 28 wherein the at least one layer is an outer layer of the film.

39. The film of claim 28 wherein the at least one layer is an internal layer of the film.

40. The film of claim 28 further comprising a second layer adjacent the at least one layer, the second layer comprising at least about 80 weight % of polymer selected from the group consisting of polyethylene having a density of from about 0.915 to about 0.93 g/cc, ionomer, and mixtures thereof.

41. The film of claim 28 further comprising a second layer adjacent the at least one layer, the second layer comprising polyethylene having a density of from about 0.915 to about 0.93 g/cc.

42. The film of claim 28 further comprising a second layer adjacent the at least one layer, the second layer comprising ionomer.

43. The film of claim 28 further comprising a second layer adjacent the at least one layer, the second layer comprising at least about 80 weight % of polymer selected from the group consisting of polyethylene having a density of from about 0.915 to about 0.93 g/cc, ionomer, and mixtures thereof wherein the at least one layer and the second layer are peelably adhered together to form a peelable seal.

44. The film of claim 43 wherein the peelable seal has a peel strength of from about 1 to about 4 lb/in.

45. The film of claim 43 wherein the peelable seal has a peel strength of from about 0.5 to about 3 lb/in.

46. The film of claim 43 wherein the peelable seal has a peel strength of from about 1 to about 2.5 lb/in.

47. The film of claim 43 wherein the peelable seal has a peel strength of from about 0.7 to about 2 lb/in.

48. The film of claim 43 further comprising a third layer adjacent the at least one layer, the third layer comprising a thermoplastic material and having a given peel strength between the at least one layer and the third layer, wherein the peel strength between the at least one layer and the third layer is greater than the peel strength between the at least one layer and the second layer.

49. The film of claim 28 wherein:

the at least one layer is capable of forming, under given heat seal conditions that include a given heat seal temperature of from 120° C. to 160° C., a first peelable seal having a peel strength with a polyethylene surface layer of a first substrate where the surface layer consists of a polyethylene having a density of from about 0.915 to about 0.93 g/cc and wherein the polyethylene surface layer has a given thickness and the first substrate has a given thickness;

the at least one layer is also capable of forming, under the given heat seal conditions that include the given heat seal temperature, a second peelable seal having a peel strength with an ionomer surface layer of a second substrate where the surface layer consists of an ionomer copolymer of ethylene and (meth)acrylic acid having at least about 80 weight % ethylene content wherein from about 15% to about 60% of the (meth)acrylic acid groups are neutralized by sodium metal ion and wherein the ionomer surface layer has the given surface layer thickness of the polyethylene surface layer and the second substrate has the given thickness of the first substrate; and the peel strength of the first peelable seal is within about 0.5 lb/in of the peel strength of the second peelable seal.

50. The film of claim 28 wherein the peel strength of the first peelable seal is within about 0.3 lb/in of the peel strength of the second peelable seal.

51. The film of claim 28 wherein the film has a thickness of no more than about 4 mils and a haze of no more than about 30%.

52. The film of claim 28 wherein the film has a Young's modulus of from about 70 to about 2000 MPa, measured at 100° C.

53. The peelably sealed package of claim 1 wherein the peelable layer comprises from about 35 to 55 weight % ethylene/unsaturated ester copolymer.

54. The peelably sealed package of claim 1 wherein the unsaturated ester comprises a vinyl ester having 5, 6, 8, or 12 carbon atoms.

55. The peelably sealed package of claim 28 wherein the peelable layer comprises from about 35 to 55 weight % ethylene/unsaturated ester copolymer.

56. The peelably sealed package of claim 28 wherein the unsaturated ester comprises a vinyl ester selected from vinyl propionate, vinyl hexanoate, and vinyl 2-ethylhexanoate.

57. The peelably sealed package of claim 28 wherein the unsaturated ester comprises a vinyl ester having 5, 6, 8, or 12 carbon atoms.

* * * * *

UNITED STATES PATENT AND TRADEMARK OFFICE
CERTIFICATE OF CORRECTION

PATENT NO.   : 6,630,237 B2
DATED        : October 7, 2003
INVENTOR(S)  : Rivett et al.

It is certified that error appears in the above-identified patent and that said Letters Patent is hereby corrected as shown below:

<u>Column 34,</u>
Line 15, "28" should be -- 49 --.
Lines 30, 33 and 36, "peelably sealed package" should be -- film --.
Line 31, "peelable" should be -- at least one --.

Signed and Sealed this

Second Day of March, 2004

JON W. DUDAS
*Acting Director of the United States Patent and Trademark Office*